US012783544B2

(12) United States Patent
Gonyea et al.

(10) Patent No.: US 12,783,544 B2
(45) Date of Patent: Nov. 3, 2026

(54) TWO-WAY MULTISOURCE SYNCHRONIZATION FOR DATABASES

(71) Applicant: Formagrid Inc, San Francisco, CA (US)

(72) Inventors: Scott Gonyea, Los Altos, CA (US); Raghavan Krishnasamy Lakshmana Perumal, Tampa, FL (US); Manan Nayak, Oakland, CA (US)

(73) Assignee: Formagrid Inc, San Francisco, CA (US)

(*) Notice: Subject to any disclaimer, the term of this patent is extended or adjusted under 35 U.S.C. 154(b) by 0 days.

(21) Appl. No.: 18/661,398

(22) Filed: May 10, 2024

(65) Prior Publication Data

US 2024/0378215 A1 Nov. 14, 2024

Related U.S. Application Data

(60) Provisional application No. 63/465,480, filed on May 10, 2023.

(51) Int. Cl.
*G06F 16/27* (2019.01)
*G06F 16/21* (2019.01)
(Continued)

(52) U.S. Cl.
CPC ............ *G06F 16/27* (2019.01); *G06F 16/213* (2019.01); *G06F 16/2343* (2019.01); *G06F 16/2365* (2019.01); *G06F 16/25* (2019.01)

(58) Field of Classification Search
CPC ...... G06F 16/27; G06F 16/2343; G06F 16/25; G06F 16/213; G06F 16/2365
See application file for complete search history.

(56) References Cited

U.S. PATENT DOCUMENTS

2008/0183763 A1 7/2008 Javalkar
2014/0068205 A1* 3/2014 Mayhew ............... H04L 49/356 711/159

(Continued)

FOREIGN PATENT DOCUMENTS

CN 106202365 B 1/2020
CN 110489389 B 4/2022

OTHER PUBLICATIONS

PCT International Search Report and Written Opinion, PCT Application No. PCT /IB2024/054574, Aug. 19, 2024, 10 pages.

*Primary Examiner* — Amy Ng
*Assistant Examiner* — Dustin D Eyers
(74) *Attorney, Agent, or Firm* — Fenwick & West LLP

(57) ABSTRACT

Disclosed herein are methods, systems, and non-transitory computer readable mediums for syncing a target table to a source table. An example method includes receiving from a target system at a first network system a first update for a target table stored on the first network system. The target table is configured to receive updates from a source table located on a second network system. Updates to the target table are managed according to a target queue. The method places the first update into the target queue while blocking access to the target queue to prevent the target queue from receiving further requests for updating the target table until the first update has been placed into a sidecar queue. The method causes the first update to be received at the second network system, the second network placing the first update into the sidecar queue for updating the source table. The sidecar queue is configured to update the source table. The method updates the source table using the first update in the sidecar queue. The method determines one or more conditions of the source table. In response, the method syncs the
(Continued)

target table to the source table to provide that data in the target table matches the data in the source table.

20 Claims, 14 Drawing Sheets

(51) Int. Cl.
*G06F 16/23* (2019.01)
*G06F 16/25* (2019.01)

(56) References Cited

U.S. PATENT DOCUMENTS

| | | | | |
|---|---|---|---|---|
| 2015/0358408 | A1 | 12/2015 | Fukatani et al. | |
| 2016/0154678 | A1* | 6/2016 | Vagg | G06F 9/546<br>718/104 |
| 2020/0278941 | A1* | 9/2020 | Bavishi | G06F 13/1642 |
| 2021/0157978 | A1* | 5/2021 | Haramati | G06F 40/177 |
| 2022/0027160 | A1* | 1/2022 | Fetterman | G06F 12/0846 |
| 2022/0129203 | A1* | 4/2022 | Pham | G06F 3/0604 |
| 2023/0004575 | A1 | 1/2023 | Harduf et al. | |

* cited by examiner

900

TWO-WAY MULTISOURCE SYNCHRONIZATION FOR DATABASES

CROSS REFERENCE TO RELATED APPLICATIONS

The present application claims the benefit of U.S. Provisional Patent Application No. 63/465,480, filed on May 10, 2023, which is hereby incorporated by reference in its entirety.

FIELD

The disclosed embodiments relate to synchronization of databases or tables across multiple network systems.

BACKGROUND

Traditional data synchronization mechanisms often operate at a whole file or directory level, and may not take into account specific update requirements of individual database tables or specific fields within tables. This could lead to less than optimal utilization of network resources, potential syncing issues, and difficulties in maintaining data integrity when simultaneous updates are required across multiple tables or fields.

SUMMARY

Disclosed herein relates to example embodiments for syncing a target table to a source table. An example computer-implemented method includes receiving, from a target system at a first network system, a first update for a target table stored on the first network system, wherein the target table is also configured to receive updates from a source table located on a second network system and wherein updates to the target table are managed according to a target queue. The method includes placing the first update into the target queue, wherein placing the first update into the target queue includes blocking access to the target queue to prevent the target queue from receiving further requests for updating the target table until the first update has been placed into a sidecar queue configured to update the source table. The method include causing the first update to be received at the second network system, the second network placing the first update into the sidecar queue for updating the source table. The method includes updating the source table using the first update in the sidecar queue. The method includes determining one or more conditions of the source table. The method includes, in response to determining the one or more conditions of the source table, syncing at least the target table to the source table to provide that data in the target table matches the data in the source table.

For example, determining the one or more conditions of the source table includes determining, using the second network system, that the source table has been successfully updated based on the first request for updating the target table.

For example, determining, using the second network system, that the source table has been successfully updated based on the first request for updating the target table includes refreshing the target table to reflect original data from the source table when the update to the source table has failed.

For example, the method includes unblocking access to the target queue after placing the first update into the sidecar queue.

For example, syncing at least the target table to the source table includes syncing a collaborating table stored on a collaborating client device.

For example, syncing at least the target table to the source table includes updating sync fields on the target table that can be changed by the source table.

For example, syncing at least the target table to the source table includes providing a notification of the synchronization to the target system.

For example, receiving, from the target system at the first network system, the first update for the target table stored on the first network system includes providing the target table, including any one of a local dependent field, a sync dependent field, and a locked field, and receiving the first update for at least one of the local dependent field and the sync dependent field of the target table. The local dependent field is an unlocked field that, when updated by the user, is automatically updated on a collaborating table stored on a collaborating client device. The sync dependent field is an unlocked field that, when updated by the user, is updated on the source table before syncing to the collaborating table stored on a collaborating client device. The locked field is not updatable by the user.

For example, the method includes updating a corresponding local dependent field on the collaborating table stored on the collaborating client device when the local dependent field is updated by the user.

For example, the method includes updating a corresponding sync dependent field on the collaborating table stored on the collaborating client device when the sync dependent field is updated on the source table.

For example, the method includes updating the locked field on the source table based on updates to the local dependent field and/or the sync dependent field.

For example, syncing at least the target table to the source table includes syncing the sync dependent field of the target table to a corresponding sync dependent field of the source table.

For example, the method includes: receiving, from the target system at the first network system, a second update for the target table; determining whether the target queue is unblocked; in response to determining that the target queue is unblocked, placing the second update into the target queue; causing the second update to be sent to the second network system, the second network placing the second update into the sidecar queue; updating the source table using the second update in the sidecar queue; determining the one or more conditions of the source table, wherein determining the one or more conditions of the source table includes determining, using the second network system, that the source table has been successfully updated based on the first and second request for updating the target table; and in response to determining the one or more conditions of the source table or the sidecar queue, syncing at least the target table to the source table to provide that data in the target table matches the data in the source table.

In yet another embodiment, a non-transitory computer-readable medium that is configured to store instructions is described. The instructions, when executed by one or more processors, cause the one or more processors to perform a process that includes steps described in the above computer-implemented method or described in any embodiment of this disclosure. In yet another embodiment, a system may include one or more processors and a storage medium that is configured to store instructions. The instructions, when executed by one or more processors, cause the one or more processors to perform a process that includes steps described in the above computer-implemented method or described in any embodiment of this disclosure.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

The techniques described herein provide for data synchronization among various data tables, whether local or external, such that the data in a synchronized data table is consistent and up to date. Synchronized data tables can be used to allow various groups of users to manage and evolve their databases and workflows independently, while still being able to collaborate on shared data tables where data from various sources is aggregated. Furthermore, this may provide data synchronization with fewer transcription errors than existing approaches.

The described techniques also provide for increased data security. For example, synchronized tables provide for limited data visibility, where access can be limited to particular users or groups. Synchronized tables enable a user to share, on a limited basis, particular subsets of data from the user's database with other users, internal or external, and the user can set, on a user-by-user or per-domain basis, read and write permissions to the shared data in the synchronized table. A synchronized data table can be used to expose particular up-to-date data to external users, e.g., from different organizations, with tight control over the schedule on which the data updates, and the ability to revoke data sharing, thus balancing collaboration and security in inter-organizational sharing.

These and other benefits can be recognized in view of the present disclosure.

I. Example Systems

I.A Network Computing Environment

Figure 1:
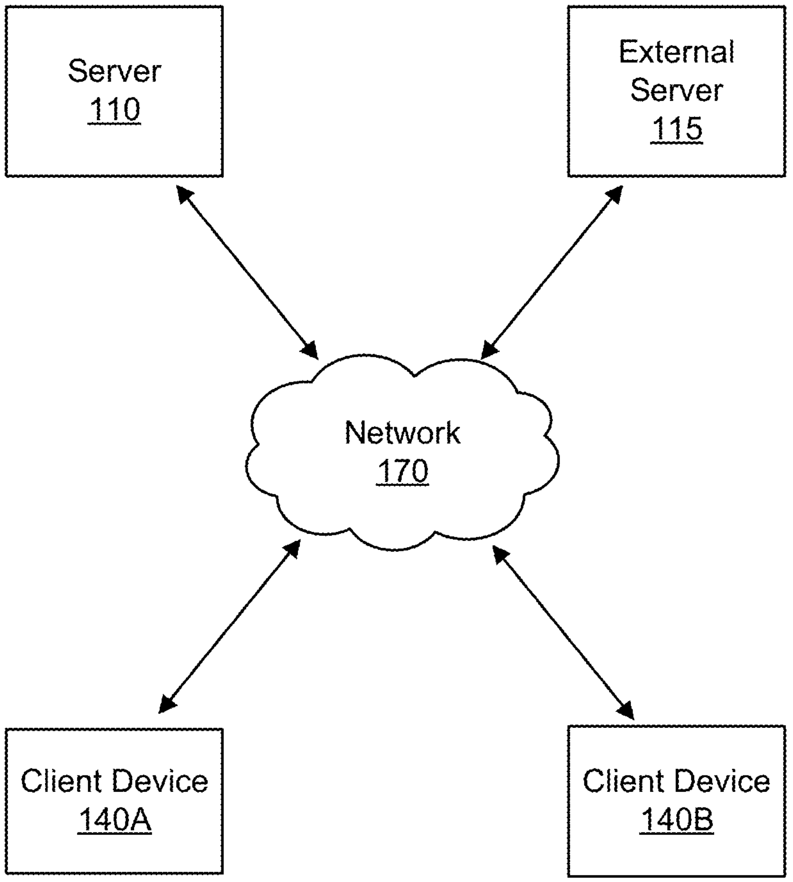
FIG. 1 is a block diagram of a networked computing environment suitable for providing partially synchronized database tables, according to one embodiment.

FIG. 1 is a block diagram of a networked computing environment suitable for providing partially synchronized database tables, according to one embodiment. In the embodiment shown, the networked computing environment 100 includes a server 110, an external server 115, a first client device 140A, and a second client device 140B, all connected via a network 170. Although two client devices 140 are shown, the networked computing environment 100 can include any number of client devices 140. Similarly, although one external server 115 is shown, the networked computing environment 100 can include any number of external servers 115. In other embodiments, the networked computing environment 100 includes different or additional elements. In addition, the functions described herein may be distributed among the elements in a different manner than described.

The server 110 hosts multiple databases and performs synchronization between databases with a cross-base synchronize function. The cross-base synchronize function copies data from a shared source view to a target table, or, in some embodiments, from the target table to a source table. That is, data may be copied in two directions during a synchronization.

When a synchronization completes, the target table contains all of the rows in the source view and cell data for all columns (alternatively, "fields") selected to be synchronized, and/or the source table contains all of the rows in the target view and cell data for all columns selected to be synchronized. In one embodiment, only data (rows and columns) that are explicitly or implicitly set as 'visible' in the shared view can be copied. Users may determine what data is available to synchronize (and in what form) using a shared view interface (e.g., to designate one or more rows or columns as visible or not visible). As described in further detail below, a user can synchronize some or all data from one or more sources to a target table, and/or user can synchronize some or all data from a target table to one or more sources. One or more of the sources can be external to the server 110, e.g., may be hosted by an external server 115.

In an embodiment, data in the target table matches the format of the data in the shared view interface. For example, if linked records are rendered as text in shared views, they also render as text in the target table. Formulas may render as their result type and look like a non-formula field. As a consequence of this design, synchronization does not differentiate between data being deleted from the source (or target) table or simply being hidden from the shared view. As described in further detail below, matching data from source to target table, or target to source table, can follow different techniques.

The following table illustrates the mapping between source and target data types for one embodiment. The mappings may allow syncs between source and targets as described below.

| Source type | Target type |
|---|---|
| Number/date/single-line text/long text/rich text/select/multi-select | Identical type and configuration (e.g. number/date formatting, select color and order) |
| Foreign key | Text |
| Collaborator/Multi-collaborator | Text |
| Lookups | As the looked-up type (so synchronizing a lookup of a foreign key will result in text) |
| Formulas/Rollups | As the result type |
| Button fields | 'Open URL' type button fields will be synchronized as URL field |
| Attachments | As-is |

A synchronized target table mirrors the contents of its source view but can contain additional unsynchronized columns to enrich the synchronized data. For example, one might collect T-shirt sizes for all employees by synchronizing into the target table a list of employees and then adding an unsynchronized 'T-shirt size' column, where each employee enriches the target table by entering their T-shirt size to a respective row at the 'T-shirt size' column.

Various embodiments of the server 110 are described in greater detail below, with reference to FIG. 2.

The client devices 140 are computing devices with which users can access and edit the databases managed by the server 110. Example client devices include desktop computers, laptop computers, smartphones, tablets, etc. The client devices 140 may enable users to interact with the databases via a user interface accessed via a browser, a dedicated software application executing on the client devices, or any other suitable software. Client devices may thereby allow users to edit source and/or target tables, and/or view information stored in source and/or target tables.

The external server 115 is a server, which may be associated with a different entity than the server 110. For example, server 110 is associated with a first organization, and server 115 is associated with a second organization. The external server 115 may be, for example, a SALESFORCE server, a JIRA server, a GOOGLE CALENDAR server, or a BOX server. Users of client devices 140 can synchronize data from source tables in databases hosted at the external server 115 to target tables at the server 110. This can involve the user providing credential information, which the server 110 uses to connect to the external server 115.

The server 110 can synchronize data from the external server 115 to a target table in a database of the server 110, or from a target table to a database in the external server 115. In one embodiment, the server 110 stores a tabular data mapping to translate data to and from the external server 115 to a usable format for server 110 databases. The server 110 may store a different tabular data mapping for each of multiple external servers 115 to facilitate data transfer between the external server 115 and target tables. For example, the server 110 may store a first tabular data mapping for SALESFORCE reports that uses a SALESFORCE application programming interface (API), a second tabular data mapping for JIRA issue filters that uses a JIRA API, and a third tabular data mapping for GOOGLE CALENDAR events that uses a GOOGLE CALENDAR API. Using the API of an external server 115, the server 110 can request and receive synchronized data for a target table, or push synchronized data to the external server 115. For example, the server 110 may send a query to the external server 115 using a respective API function, where the query specifies the data to be synchronized to the target table, and then the server 110 receives, via a different API function, query results including the synchronized data from the external server 115. The server 110 identifies an external server 115, fetches the respective tabular data mapping, and uses the respective tabular data mapping to synchronize data from the external server 115 (e.g., to a target table). Similar processes are used to synchronize data from a target table to the external server 115.

The network 170 provides the communication channels via which the other elements of the networked computing environment 100 communicate. The network 170 can include any combination of local area and wide area networks, using wired or wireless communication systems. In one embodiment, the network 170 uses standard communications technologies and protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Embodiments of various techniques of the networked computing environment 100 will now be described. Alternative techniques may be employed without departing from the principles set forth herein.

A user of client device 140A can interface with the server 110 to interact with target and/or source tables and synchronize data between them. For instance, the user of client device 140A can create a synchronized target table according to one or more techniques, depending upon the embodiment. Additionally, the user of the client device can synchronize a source table with information stored in the target table, depending on the embodiment.

The user interface may be exposed by the server 110 or client device 140A. In one embodiment, the user receives a link to a shared view (e.g., from an administrator of the database including the shared view). The user provides an instruction the server 110 to use the link to initiate a synchronization, either with a new table or an existing table. The server 110 sets up the requested synchronization between the shared view and the selected table. In one embodiment, the user selects a widget of a user interface exposed by the server 110 that displays a shared view to create a new synchronized table using the shared view.

In an embodiment, the user can restrict access to the table such that it is password protected. Additionally or alternatively, the user can restrict access to the table such that only users associated with specified email addresses or email domains can access the table.

In one embodiment, if a source table is password-protected, the user initiating synchronization to a target table or to a source table is prompted to correctly enter the password to the source table or target table in order to set up the synchronization. Once the password has been entered, synchronization may operate automatically, indefinitely, or for a predetermined time period (e.g., one month or one year) without requiring password reentry. If the password changes, or if a password is added to a previously unprotected table, the synchronization stops working until authenticated or reauthenticated. In an embodiment, the user can revoke access temporarily or permanently.

In one embodiment, if a source or target table is email domain-protected, the user initiating the synchronization needs to have a verified email with a permissioned domain in order to set up the synchronization. If the initiating user's email address with the permissioned domain is deactivated, suspended, or otherwise made inactive, the synchronization may cease to operate. Alternatively, a synchronization may remain operational as long as any user of the source or target table has an email address with a permissioned domain.

In an embodiment, the user can add one or more external source tables to a synchronized table by selecting an external source widget in the user interface. The user can then pick another source type (e.g. AIRTABLE, SALESFORCE, or JIRA.), select the source table within that type, and then map the fields from the new source table to the fields in the existing table. For each column in the target table, the user interface displays a list of columns in the source table, from which the user can select one column in the source table to associate with the column in the target table (e.g., such that data from the column in the source table is synchronized to the respective column in the target table).

In some embodiments, when adding a new source, the server 110 tries to match column names to existing column names. For columns that cannot be matched, the default option may be to synchronize that data to a new column in the table being synchronized instead. The user can change any mappings or opt to synchronize any column to a new synchronized column.

In an embodiment, an option to select all columns is not available when there are multiple synchronization sources. When the user adds a new source table, if an existing source table is configured to synchronize all columns, that source table is changed to synchronize specific columns only. The user can use the user interface to alter the field mapping by selecting a widget to change mappings. In an embodiment, synchronized target tables that do not synchronize from multiple source tables do not include a field mapping. Rather, the target table uses the fields of the source synchronization table.

In an embodiment, after a synchronization is initiated for a target table from a source table, for every source table field, the user can select a new target table field in a dropdown of the user interface to change the target table field associated with the source table field.

Alternatively or additionally, the user can uncheck a field in the user interface to stop synchronizing data between table fields, where, if this one table was the primary source, the synchronized table column will be destroyed.

Alternatively or additionally, the user can synchronize to a table field, where if a first table field in a first table was previously mapped to a second table field in a second table and the first table was the primary source of table information, the second field may be destroyed, and the data mapped to a third, new field instead. If the first table was not the primary source of table information, the data may be mapped to a new, fourth field. If the first table field was previously unmapped, the data in the first table field may be mapped to a new, fifth table field. The third, fourth, and fifth field may be in the same table or different tables.

In an embodiment, the user can reconfigure, using the user interface, a selection of one or more columns to synchronize to a target table from a source table or from a target table to a source table. Alternatively or additionally, the user can reconfigure a synchronization frequency with which tables synchronize to one another.

Alternatively or additionally, the user can reconfigure whether deleted or hidden rows in a first table are deleted in their synchronized second table, where if the user does not choose to delete rows, rows will remain in the synchronized second table even after they are deleted in the first table (these rows can be removed by the user).

Alternatively or additionally, the user can remove a first table, which removes all rows associated with the first table in a synchronized second table. Alternatively or additionally, the user can turn off synchronization functionality for a synchronized second table, which converts the synchronized second table into a normal (e.g., unsynchronized) data table.

Alternatively or additionally, the user can undo a reconfiguration of a second synchronized table, which restores the previous set of selected fields, the old synchronize frequency, the old row deletion setting, and so on in the second synchronized table; however, the availability of the fields and the cell values in the fields remains up to date, since the values come from the first table, and as such they are not reverted to their data from before the reconfiguration.

Alternatively or additionally, the user can trigger a manual synchronization by clicking a widget of the user interface to initiate a synchronization. The user can do this even when the table is configured to synchronize automatically. This allows the user to synchronize a table without having to wait for the next scheduled synchronization.

In one embodiment, if a second, synchronized table is duplicated, the duplicate table has the same configuration as the original second, synchronized table. If the user deletes a second, synchronized table, then restores it, the second, synchronized table may regain its original configuration from before its deletion.

In an embodiment, the user can change one or more column names or descriptions of the synchronized portion of a table. This can be used to rename columns to be more appropriate for the synchronized table, for example. In an embodiment, when a user hovers over a column icon in the user interface, they can see the name of the respective table column (if the synchronized column has a different name). Depending upon the embodiment, the user may or may not be able to add a row, destroy a row, reconfigure a synchronized column, or edit a cell in a synchronized column.

The following table illustrates some example correspondence actions taken on a second, synchronized table responsive changes in a first table subsequent to a synchronization, according to one embodiment:

| First table action | Second table behavior on next synchronization |
|---|---|
| Destroy/hide column | Destroy column |
| Undestroy/unhide column | Undestroy column if possible/else create a new column. |
| Add column | If 'synchronize all fields' is enabled, add column |
| Add row | Row will be added to the target table |
| Destroy/hide row | If 'synchronize deletions' is enabled: destroy row Otherwise: the "open source record" button gets disabled |
| Change cell values | Change cell values (based on type conversion) |
| Change filters | The set of visible rows will be synchronized |
| Reorder rows | No impact |
| Change column configuration to unsupported type/configuration | Destroy column |
| Change column configuration to supported type/configuration | Change column config (based on type conversion) |
| Disable synchronizing | Synchronizing stops working |
| Re-enable synchronizing | Synchronizing resumes |
| Delete view | Synchronizing stops working |
| Undestroy view | Synchronizing resumes |
| Change share URL | Synchronizing stops, requires re-authentication |
| Add/change shared view password | Synchronizing stops, requires re-authentication |
| Add domain restriction that the user does not satisfy | Synchronizing stops, requires re-authentication by a user in the target table with the appropriate domain |

In an embodiment, a user can generate a view-only link to send to another user, which the other user can use to view a second, synchronized table only (i.e., the other user cannot edit the target table). Alternatively or additionally, the user can set a user (e.g., by identifier or email address) or a domain as view-only, where the respective one or more users can view but not edit the target table.

In an embodiment, if a field of a first table was previously synchronized but has since been made unable to be synchronized (e.g., by an administrator of the first table), the user interface may display the first table column as visually distinct (e.g., faded out or an alternative color) than other first table columns. The user can toggle whether to synchronize currently unavailable fields, though they do not appear when the user toggles them on. Only fields that are currently available from the first table, along with any currently selected but unavailable fields, appear in the field list.

I.B Example Server System

Figure 2:
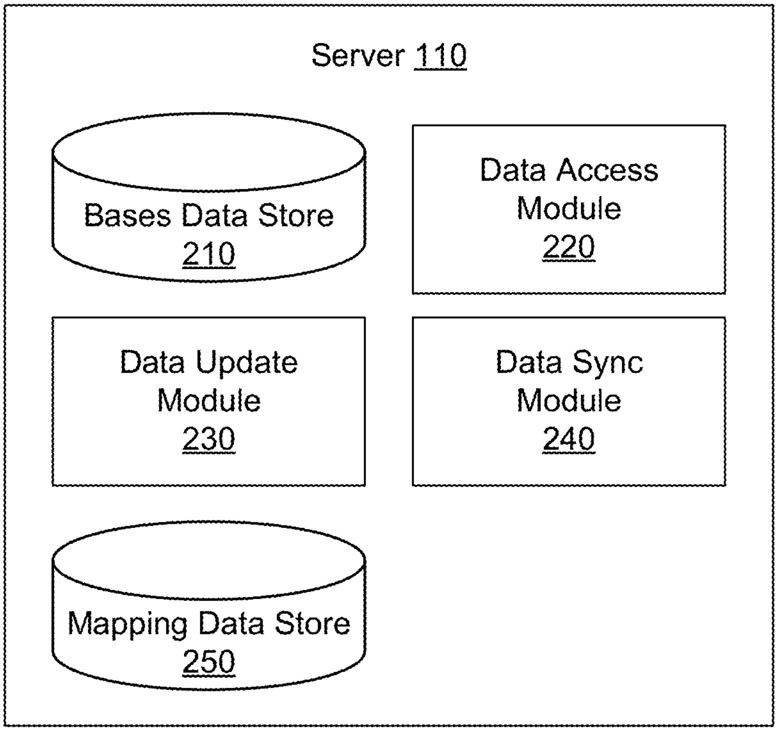
FIG. 2 is a block diagram of the server of FIG. 1, according to one embodiment.

FIG. 2 is a block diagram of the server of FIG. 1, according to one embodiment. In the embodiment shown, the server 110 includes a bases data store 210, a data access module 220, a data update module 230, a data synchronization module 240, and a mapping data store 250. In other embodiments, the server 110 includes different or additional elements. In addition, the functions may be distributed among the elements in a different manner than described.

The bases data store 210 includes one or more computer-readable media that store the one or more databases managed by the server 110. Although the bases data store 210 is shown as a single element within the server 110 for convenience, the bases data store 210 may be distributed across multiple computing devices (e.g., as a distributed database). Similarly, individual databases may be hosted by client devices 140 (or other computing devices) with the server 110 managing synchronization between databases but not storing the databases themselves.

The data access module 220 provides a mechanism for users to access data in one or more databases. In one embodiment, the data access module 220 receives a request from a client device 140 indicating an identifier of the requesting user (e.g., a username or user identifier) and data from a specified table in a specified database that the user wishes to view. The data access module 220 determines whether the user has permission to access the requested data and, if so, provides it to the client device 140 from which the request was received for display to the user.

The data update module 230 provides a mechanism for creators and their collaborators to edit data in and add data to databases. In one embodiment, the data update module 230 receives a request from a client device 140 indicating an identifier of the requesting user and data to be added to or amended into a specified table in a specified database. The data update module 230 determines whether the requesting user has permission to edit the specified table and, if so, updates the specified table in the bases data store 210 as requested.

The data synchronization module 240 updates some or all portions of target table (or tables) to synchronize them with the corresponding source table (or tables). Similarly, the data synchronization module 240 updates some or all portions of source tables to synchronize them with their corresponding target table. In other words, the data synchronization module 240 allows for two-way synchronization between tables within the system environment 100.

The data synchronization module 240 may control synchronization in a number of ways. In an embodiment, the data synchronization module 240 periodically (e.g., for a length of time ranging from one second to one hour, such as every five minutes, every hour, etc.) checks the one or more source tables and, if there is updated data available, imports it into the corresponding one or more target tables (e.g., updates records in the target table with respective records from the source table). Additionally or alternatively, users of a table may force a manual synchronization to its synchronized table (e.g., by selecting a control in the user interface). Additionally or alternatively, the data synchronization module 240 may employ specific methods and processes for synchronizing data between tables, some of which are described in greater detail below.

The mapping data store 250 includes one or more computer-readable media that store tabular data mappings for one or more external servers 115. Although the mapping data store 250 is shown as a single element within the server 110 for convenience, the mapping data store 250 may be distributed across multiple computing devices (e.g., as a distributed database).

I.C Example Base Data Store

Figure 3:
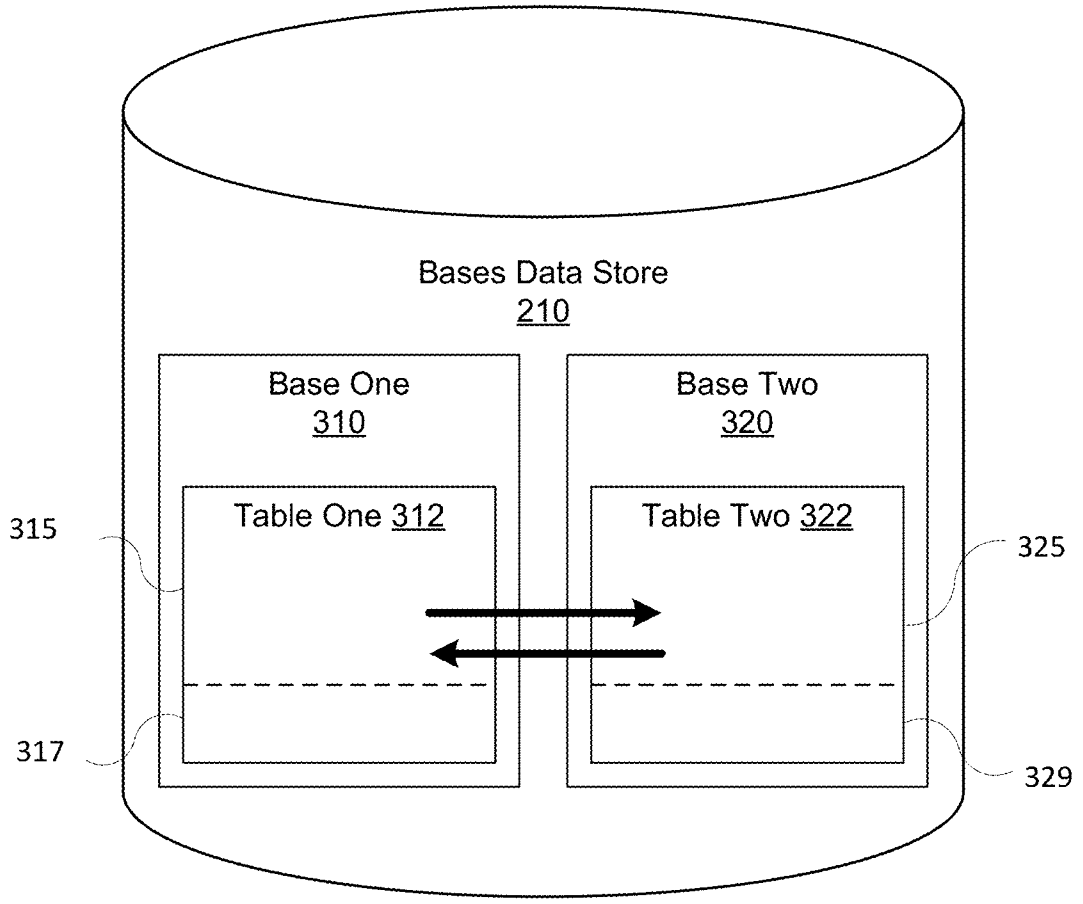
FIG. 3 illustrates two-way synchronization of two tables of two databases in the bases data store, according to one embodiment.

FIG. 3 illustrates two-way synchronization of two tables of two databases in the bases data store, according to one embodiment. In the embodiment shown, the bases data store 210 includes base one 310 and base two 320. In practice, the bases data store 210 will likely include many more (e.g., hundreds, thousands, or even millions of) bases. Base one 310 includes table one 312, which has a synchronized portion 315 and an unsynchronized portion 317. Base two 320 includes table two 322, which includes a synchronized portion 325 and an unsynchronized portion 329. The synchronized portions 315, 325 may include data added by users of base one 310 and base two 320, data synchronized from a third table, or both. In this illustrated configuration, the data synchronization module 240 is configured to both (1) synchronize data in the synchronized portion 315 of table one 312 in base one 310 to its corresponding synchronized portion 325 in table two 322 of base two 320, and (2) synchronize data in the synchronized portion 325 in table two 322 of base two 322 to its corresponding synchronized portion 315 in table one 312 of base one 310.

As described above, two-way synchronization is a challenging problem where a first table in a first base (e.g., table one 312 in base one 310) is a source table and the second table (e.g., table two 322 in base two 320) is a target table. The challenge arises in managing underlying and potentially competing data changes in real-time. Management and implementation can be computationally expensive and induces complex information management between the tables by the data synchronization module 240.

In an example embodiment, to enable two-way synchronization between the target table and the source table, the data synchronization module 240 generates a separate, parallel table (hereinafter, a "sidecar") to store edits coming from one or more target tables (e.g., table one 312) synchronized to a source table (e.g., table two 322) that may affect information in that source table. Notably, given that synchronization between bases is two-way, the labels of source base and target base are largely interchangeable. That is, the configuration of the data synchronization module 240 enables a source table to synchronize information to a target table and, similarly, a target table to synchronize information to a source table.

To illustrate two-way synchronization, consider an example where a single source table is used to create, e.g., 100 target tables, and each of those target tables are synchronized with the source table such that edits to the target table(s) are propagated to the source table without employing a sidecar. In this case, all of the create, read, update, and delete (hereinafter "CRUD") requests from the 100 target tables compete to update the source table. Moreover, the source table is continuously trying to synchronize target tables with its constantly updated information, and that synchronizing information may conflict with information currently in the target table(s). More simply, desynchronization between source tables and target tables may occur if the information is not managed with a sidecar.

Now consider, in a different example, a situation where updates from the target tables are loaded into a sidecar. In this situation, rather than all of the CRUD requests continuously seeking to change the source table itself, the data synchronization module 240 maintains those updates in the sidecar table. The data synchronization module 240 then updates the source table using the sidecar table. In various examples, the data synchronization module 240 may update the source table with the most recent edit, the most consistent edit, the oldest edits, an aggregated edit, at the end of each CRUD request, etc., from the sidecar, depending on the configuration. As such, the synchronization module may update the source table nearly instantly, or may delay the update as necessary (e.g., during two-way external sync. The data synchronization module 240 then synchronizes the target tables with the updated source table.

Figure 4:
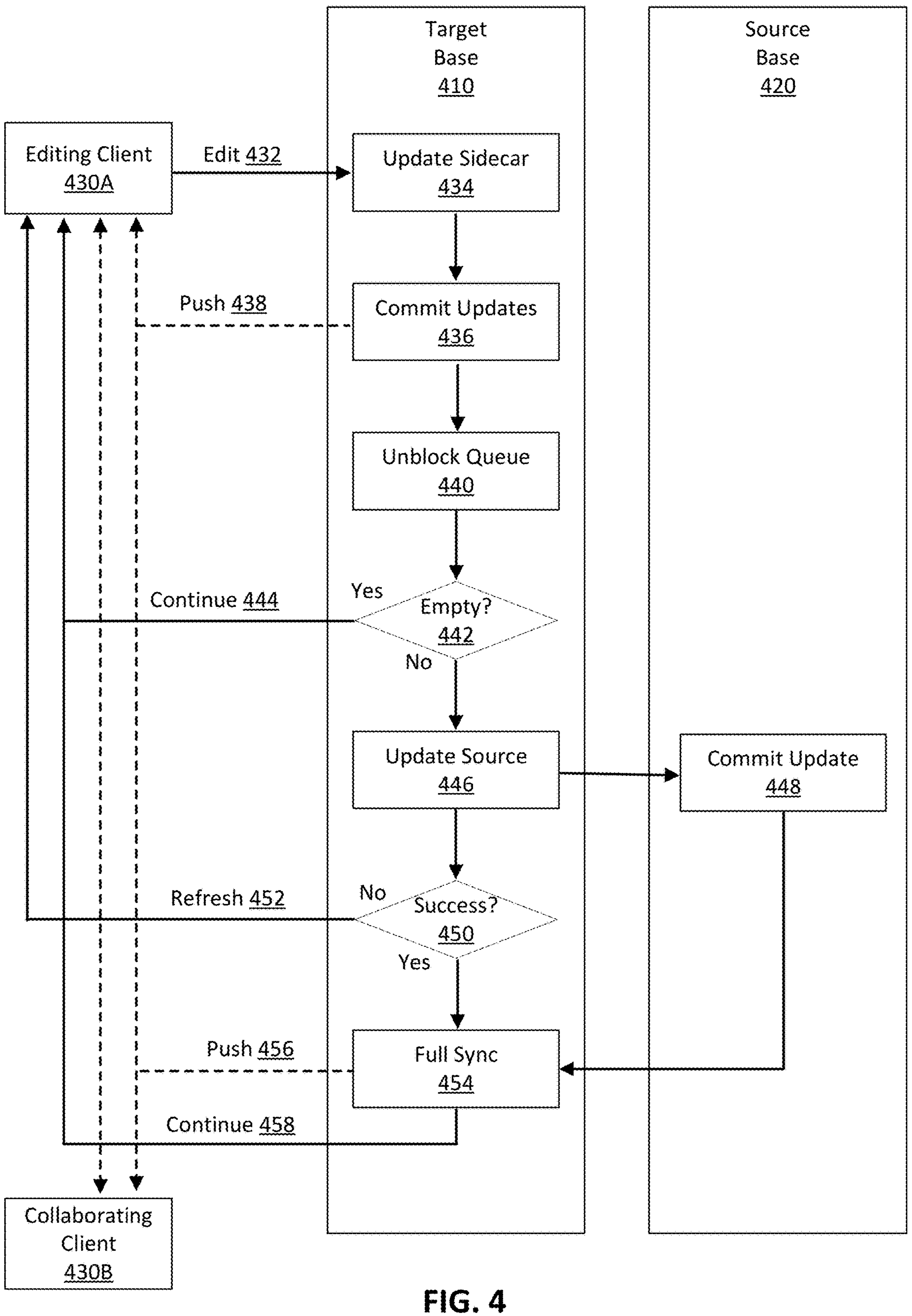
FIG. 4 illustrates an example workflow for managing synchronization from a second, target base to a first, source base using a sidecar, according to one embodiment.

FIG. 4 illustrates an example workflow for managing synchronization from a second, target base to a first, source base using a sidecar, according to one embodiment.

In FIG. 4, a target base 410 is created from a source base 420. The source base 420 is synchronized to the target base 410 such that updates to the source base 410 are propagated to the target base 420. Additionally, the target base 410 is synchronized to the source base 420 such that edits to the target base 310 are propagated to the source base 320 (which can then be propagated to the target base 410). Moreover, an editing client device 430A (e.g., client device 140) is configured to edit fields in a table of the target base 410, and a collaborating client device 430B is configured to view (but not edit) the table in the target base 410.

At step 432, the editing client 430A generates an edit for the target base 410 by manipulating the table. The edit may be placed in the CRUD queue for the source base 420.

At step 434, rather than directly committing the edit to the source base 410 from the CRUD queue, the data synchronization module (e.g., data synchronization module 240) may place the edit in the sidecar. Committing the edit to the source base may occur at the end of the CRUD request.

At step 436, the data synchronization module commits the edit from the sidecar to the target base 410 (but not to the source base 420). The edit updates information in the target base 410 to reflect the edit.

At step 438, the data synchronization module pushes the edited information to the editing client 430A and the collaborating client 430B such that the user interface of those devices reflects the edited information. Notably, the source base 420 has yet to be updated with the edit received from the editing client 430A, and, as such, the editing client 430A and collaborating client 430B may not be viewing the information actually stored in the source base 420.

At step 438, the data synchronization module unblocks the CRUD queue for the source base 420. Unblocking the CRUD queue allows additional edits (if present) to be placed into the CRUD queue for the source base 420, which may then be placed in the sidecar as described above.

At step 440, the data synchronization module checks if the sidecar is empty (i.e., whether all updates in the sidecar have been propagated to the source base 420). The data synchronization module may check if the sidecar is empty after a predetermined amount of time, after a threshold number of received edits, at specific predefined times, etc.

If the sidecar is empty, the process continues 444. That is, an editing client 430A may make edits (e.g., edit 432) to the target base 410 that will synchronize to the source base 420 as described above.

If the sidecar is not empty, the data synchronization module updates 446 the source base 420. Updating the source base 420 may include committing 448 update information from the sidecar table and/or target base 410 to the source base 420.

At step 450, the data synchronization module determines if updating the source base 420 was successful.

If updating the source base 420 is not successful, the data synchronization module induces a refresh 452 on the editing client 430A. Inducing a refresh causes the editing client 430A to view information that is actually in the source base 420 (because it was not updated to reflect the information in the target base 410).

If updating the source base is successful, the data synchronization module synchronizes 454 the target base 410 with the source base 420. That is, data in the target base 410 is updated to reflect the (now updated) data in the source base 420. Notably, before this point, any data that was "updated" in the target base 410 (or at the editing client 430A or collaborating client 430B) did not reflect the information in the source base 420, only the information that had been edited into the target base 410 and/or committed to the target base 410 from the sidecar.

At step 456, the data synchronization module pushes information in the target base 410 to the editing client 430A and collaborating client 430B such that they are visible to users viewing the target base 410.

At step 458, the process continues. That is, an editing client 430A may make edits (e.g., edit 432) to the target base 410 that will synchronize to the source base 420.

The process described in FIG. 4 may have slight variations as to when and how updates are committed to the target base 410, the source base 420, the sidecar, etc., some of which are outlined below.

II. Example Methods

As described above, FIG. 4 provides a general process for enabling two-way synchronization between a target base and a source base. The methods outlined below provide variations on the general process of FIG. 4 for implementing two-way synchronization.

II.A Method 1: Non-Blocking Client Driven Writes

Figure 5:
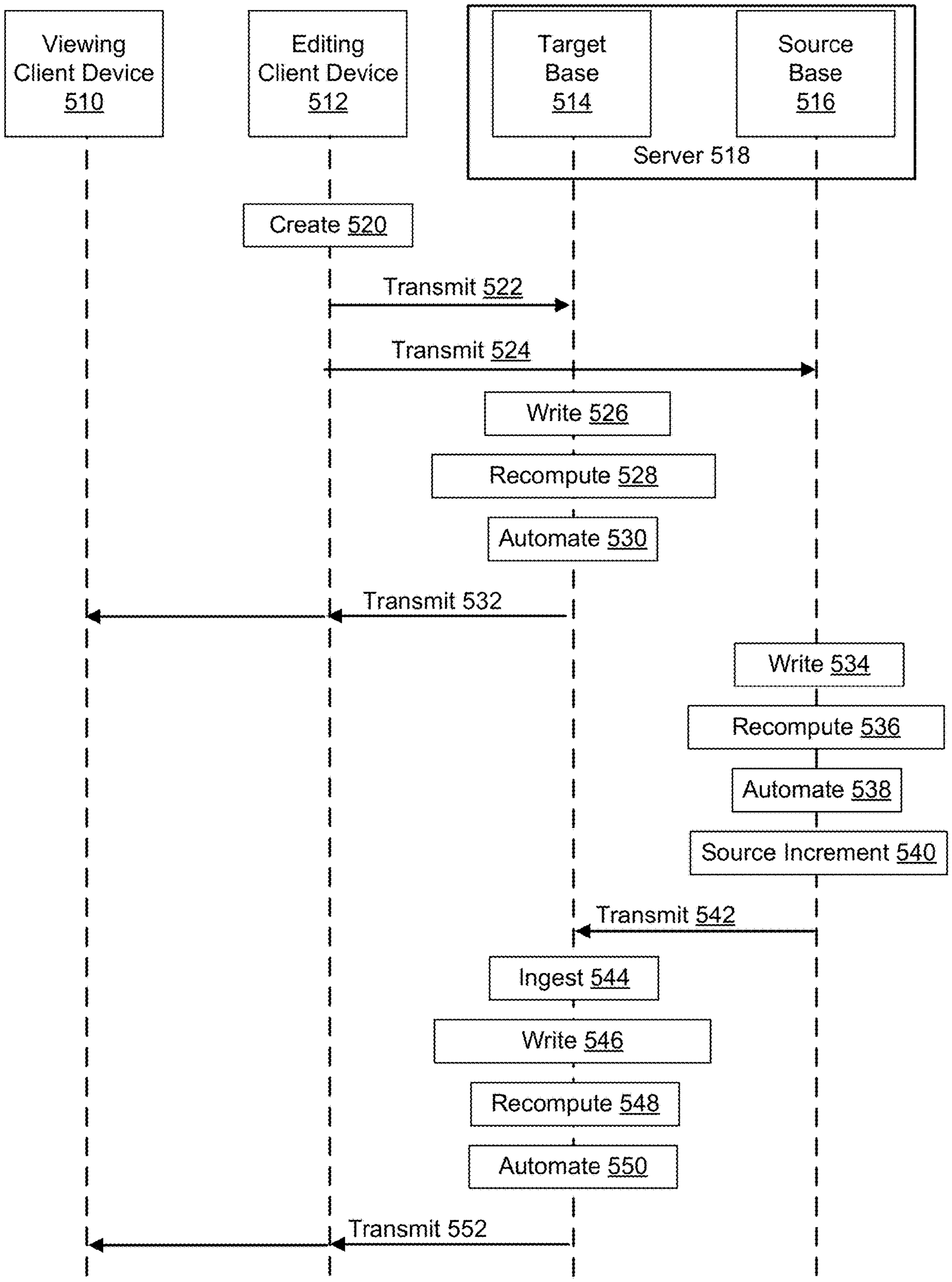
FIG. 5 illustrates an interaction diagram for a first example dual-synchronization process between a target base and a source base, according to one embodiment.

FIG. 5 illustrates an interaction diagram for a first example dual-synchronization process between a target base and a source base, according to one embodiment. The first process occurs within a system environment (e.g., system environment 100) and enables non-blocking client driven writes. That is, edits to a source base stem directly from the client device making an edit on its client device to a target base generated from that source base.

As illustrated, the system environment includes two client devices (e.g., client devices 140A, 140B)—an editing client device 512 and a collaborating client device 510. The client devices manipulate a target base 514 and a source base 516 in a base data store (e.g., base data store 210) on a server 518. The source base 516 is configured to synchronize information to the target base 514, and the target base 514 is configured to synchronize information to the source base 516 (i.e., two-way synchronization), as described below. The editing client device 512 is viewing the target base 514, and the viewing client device 510 is viewing the source base 516.

At step 520, a user operating the editing client device 512 creates 520 an edit in the target base 514. For instance, changing a field in the target base 514, i.e., generating a CRUD request. At this point, the target base 514 has not been updated with the edit because the edit exists locally on the editing client device 512 and has yet to be transmitted to the server 518.

At step 522, the editing client device 512 transmits the update to the target base 514. Transmitting the update may include transmitting the update created on the editing client device 512 to the server 518. As described above, this may close the CRUD queue for the target base 514 and add the edit to the sidecar.

At step 524, the editing client device 512 transmits the edit to the source base 516 on the server 518. In some examples, the server 518 may automatically transfer the edit from the target base 514 to the source base 516 at step 522.

At step 526, the server 518 writes the edit to the target base 514. As described above, writing the edit to the target base 514 may come from pushing information from the sidecar to the target base 514.

At step 528, the server recomputes the target base with the written edit. Recomputing the target base 514 may recompute local fields, e.g., formulas, in the target base 514 dependent on the edit. Recomputing the target base 514 may include using the edit information stored in the sidecar.

At step 530, the server performs various automations based on the local recompute of the target base 514. This may include updating synced fields in other bases (e.g., source base 516). In some example configurations automations are action in a base that react to updates on certain columns or rows. For instance, an editor may enable an action that, when a particular row is updated, an email is sent to the user. In another example, an editor may enable an automated action that, when a status is set to "Done", Tweet.

At step 532, the server 518 transmits the information in the target base 514 to the editing client device 512 and the collaborating client device 510. The editing client device 512 views different information in the target base 514 than the collaborating client device 510 views in the source base 516 because server 518 has not completed two-way synchronization. That is, in this example, because the server 518 has only performed a recompute using local information (rather than synced information) the information in target base 514 and the source base 516 may be different.

At step 534, the server 518 writes the edit to the source base 516. Writing information to the source base 516 may include writing edits from the sidecar into the source base 516.

At step 536, the server 518 performs a local recompute of the source base 516 with the written edit. Recomputing the source base 516 may recompute local fields in the source base 516 dependent on fields modified by the edit.

At step 538, the server 518 performs various automations based on the local recompute of the source base 516.

At step 540, the server 518 increments the source table sync payload. Incrementing the source base sync payload, in effect, allows the server 518 to push source base 514 updates to synced target bases 516 in semi-real time, with each update reflecting the most recent update to the source base 516 (rather than each, or all, of the updates to the source base). Stated differently, the synchronization module may version each payload, and may sometimes collect multiple payloads (if created in rapid succession) and push them together to client devices.

At step 542, the server 518 transmits the sync payload from the source base 516 to the target base 514.

At step 544, the server 518 ingest and syncs the sync payloads from the source base 516. Much like syncing the source increments, syncing ingested payloads allows the server 518 to judiciously write updates to the target base 514 such that the written updates are not stale.

At step 546, the server 518 writes the sync payload to the target base 514.

At step 548, the server 518 performs a local recompute of the target base 514 with the sync payload.

At step 550, the server 518 performs various automations based on the local recompute of the target base 514.

At step 552, the server 518 transmits the information in the target base 514 to the editing client device 512 and the collaborating client device 510. The editing client device 512 views the same information in the target base 514 as the collaborating client device 510 views in the source base 516 because server 518 has completed two-way synchronization. That is, in this example, because the server 514 performs both a local and synced recompute on the target base 514, and only a local recompute on the source base 516, the information in each may be different.

In this example workflow, because the data synchronization module 240 enables "non-blocking server side writes" the CRUD queue is never locked.

II.B Method 2: Consistent, Non-Blocking Server-Side Writes

Figure 6:
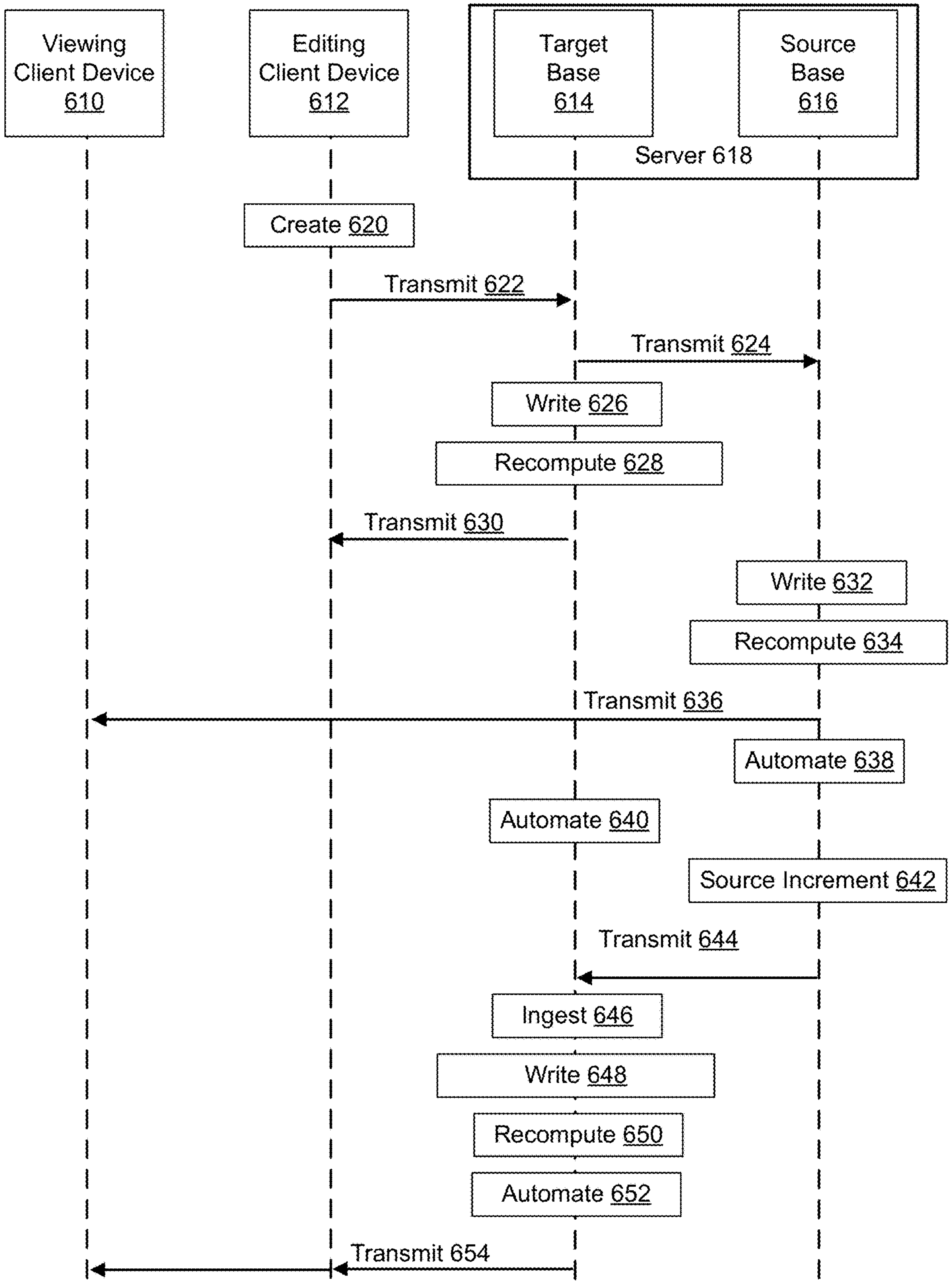
FIG. 6 illustrates an interaction diagram for a second example dual-synchronization process between a target base and a source base, according to one embodiment.

FIG. 6 illustrates an interaction diagram for a second example dual-synchronization process between a target base and a source base, according to one embodiment. The second process occurs within a system environment (e.g., system environment 100) and enables consistent, non-blocking client driven server-side writes. Some of the steps described in FIG. 6 may be similar to those provided in the process 900 of FIG. 9 of the present disclosure.

As illustrated, the system environment includes two client devices (e.g., client devices 140A, 140B)—an editing client device 612 and a collaborating client device 610. The client devices manipulate a target base 614 and a source base 616 in a base data store (e.g., base data store 210) on a server 618. The source base 616 is configured to synchronize information to the target base 614, and the target base 614 is configured to synchronize information to the source base 616 (i.e., two-way synchronization), as described below.

The editing client device 612 is viewing the target base 614, and the viewing client device 610 is viewing the source base 516.

At step 620, a user operating the editing client device 612 creates 620 an edit using the target base 614. For instance, changing a field in the target base 614, i.e., generating a CRUD request. At this point, the target base 614 has not been updated with the edit because the edit exists locally on the editing client device 612 and has yet to be transmitted to the server 618.

At step 622, the editing client device 612 transmits the update to the target base 614. Transmitting the update may include transmitting the update created on the editing client device 612 to the server 618. As described above, this may close the CRUD queue for the target base 614 and add the edit to the sidecar.

At step 624, the server 618 transfers the edit from the target base 614 to the source base 616.

At step 626, the server 618 writes the edit to the target base 614. As described above, writing the edit to the target base 614 may come from pushing information from the sidecar to the target base 614.

At step 628, the server recomputes the target base with the written edit. Recomputing the target base 614 may recompute local fields (i.e., local recompute), e.g., formulas, in the target base 614 dependent on the edit. Recomputing the target base 614 may include using the edit information stored in the sidecar.

At step 630, the server 618 transmits the information in the target base 614 to the editing client device 612 and the collaborating client device 610. The editing client device 612 views different information in the target base 614 than the collaborating client device 610 views in the source base 616 because server 618 has not completed two-way synchronization. That is, in this example, because the server 618 has only performed a recompute using local information (rather than synced information) the information in target base 614 and the source base 616 may be different.

At step 632, the server 618 writes the edit to the source base 616. Writing information to the source base 616 may include writing edits from the sidecar into the source base 616.

At step 634, the server 618 performs a local recompute of the source base 616 with the written edit. Recomputing the source base 616 may recompute local fields in the source base 616 dependent on fields modified by the edit.

At step 636, the server 618 transmits the information in the source base 614 to the viewing client device 614.

At step 638, the server 618 performs various automations based on the local recompute of the source base 616. Automations are described hereinabove.

At step 640, the server 618 performs various automations (e.g., syncing information in synced fields) based on the local recompute of the target base 614. Automations are described hereinabove.

At step 642, the server 618 increments the source base sync payload. Incrementing the source base sync payload, in effect, allows the server 618 to push source base 614 updates to synced target bases 616 in semi-real time, with each update reflecting the most recent update to the source base 616 (rather than each, or all, of the updates to the source base). Stated differently, the synchronization module may version each payload, and may sometimes collect multiple payloads (if created in rapid succession) and push them together to client devices.

At step 644, the server 618 transmits the sync payload from the source base 616 to the target base 614.

At step 646, the server 618 ingest and syncs the sync payloads from the source base 616. Much like syncing the source increments, syncing ingested payloads allows the server 618 to judiciously write updates to the target base 614 such that the written updates are not stale.

At step 648, the server 618 writes the sync payload to the target base 614.

At step 650, the server 618 performs a local recompute of the target base 614 with the sync payload.

At step 652, the server 618 performs various automations based on the local recompute of the target base 614. Automations are described hereinabove.

At step 654, the server 618 transmits the information in the target base 614 to the editing client device 612 and the collaborating client device 610. The editing client device 612 views the same information in the target base 614 as the collaborating client device 610 views in the source base 616 because server 618 has completed two-way synchronization. That is, in this example, because the server 614 performs both a local and synced recompute on the target base 614, and only a local recompute on the source base 616, the information in each may be different.

In this example workflow, because the data synchronization module 240 enables "consistent, non-blocking server-side writes" the CRUD queue is locked after an edit is generated and unlocked between the recompute and the transmit actions (e.g., just before transmit 630).

II.C Method 3: Blocking Server-Side Writes

Figure 7:
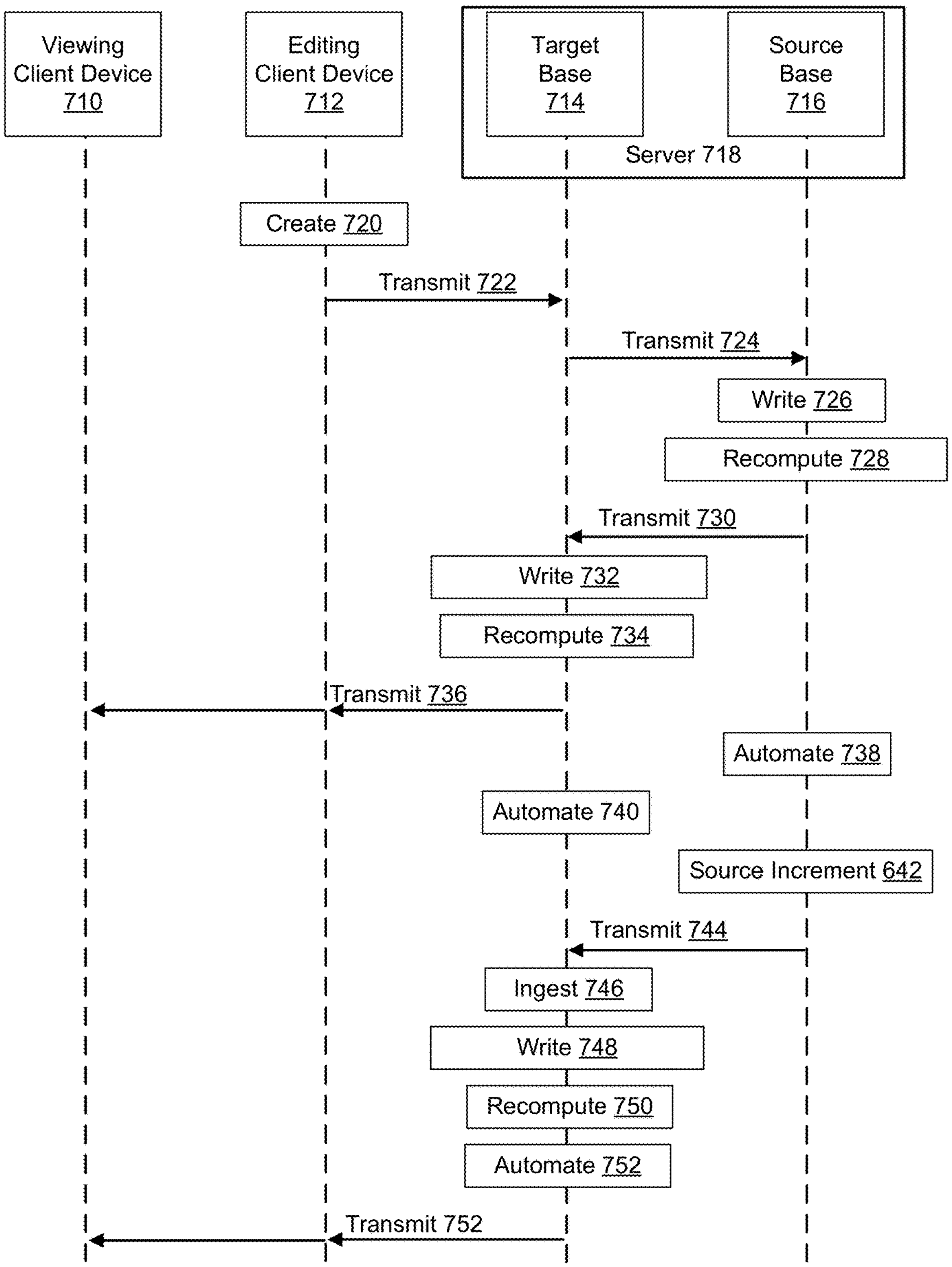
FIG. 7 illustrates an interaction diagram for a third example dual-synchronization process between a target base and a source base, according to one embodiment.

FIG. 7 illustrates an interaction diagram for a third example dual-synchronization process between a target base and a source base, according to one embodiment. The third process occurs within a system environment (e.g., system environment 100) and enables blocking server-side writes.

As illustrated, the system environment includes two client devices (e.g., client devices 140A, 140B)—an editing client device 712 and a collaborating client device 710. The client devices manipulate a target base 714 and a source base 716 in a base data store (e.g., base data store 210) on a server 718. The source base 716 is configured to synchronize information to the target base 714, and the target base 714 is configured to synchronize information to the source base 716 (i.e., two-way synchronization), as described below. The editing client device 712 is viewing the target base 714, and the viewing client device 710 is viewing the source base 716.

At step 720, a user operating the editing client device 712 creates 720 an edit using the target base 714. For instance, changing a field in the target base 714, i.e., generating a CRUD request. At this point, the target base 714 has not been updated with the edit because the edit exists locally on the editing client device and has yet to be transmitted to the server 718.

At step 722, the editing client device 712 transmits the update to the target base 714. Transmitting the update may include transmitting the update created on the editing client device 712 to the server 718. As described above, this may close the CRUD queue for the target base 714 and add the edit to the sidecar.

At step 724, the server 718 transfers the edit from the target base 714 to the source base 716.

At step 726, the server 718 writes the edit to the source base 716. Writing information to the source base 716 may include writing edits from the sidecar into the source base 716.

At step 728, the server 718 performs a local recompute of the source base 716 with the written edit. Recomputing the source base 716 may recompute local fields in the source base 716 dependent on fields modified by the edit.

At step 730, the server 718 transmits the information in the source base 716 to the target base 714.

At step 732, the server 718 writes the information to the target base 714. Writing the information may include optimistic source data. Writing optimistic source data means that the data synchronization module writes the source base's written values to the target at the same time.

At step 734, the server 718 recomputes the target base 714 with the new information. Recomputing the target base 714 may recompute local fields (i.e., local recompute), e.g., formulas, in the target base 714 dependent on the new information.

At step 732, the server 718 transmits the information in the target base 714 to the editing client device 712 and the collaborating client device 710. The editing client device 712 views different information in the target base 714 than the collaborating client device 710 views in the source base 716 because server 718 has only updated the target base 714 with optimistic source data.

At step 738, the server 718 performs various automations based on the local recompute of the source base 716. Automations are described hereinabove.

At step 740, the server 718 performs various automations based on the local recompute of the target base 714. Automations are described hereinabove.

At step 742, the server 718 increments the source base sync payload. Incrementing the source base sync payload, in effect, allows the server 718 to push source base 714 updates to synced target bases 716 in semi-real time, with each update reflecting the most recent update to the source base 716 (rather than each, or all, of the updates to the source base). Stated differently, the synchronization module may version each payload, and may sometimes collect multiple payloads (if created in rapid succession) and push them together to client devices.

At step 744, the server 718 transmits the sync payload from the source base 716 to the target base 714.

At step 746, the server 718 ingest and syncs the sync payloads from the source base 716. Much like syncing the source increments, syncing ingested payloads allows the server 718 to judiciously write updates to the target base 714 such that the written updates are not stale.

At step 748, the server 718 writes the sync payload to the target base 714.

At step 750, the server 718 performs a local recompute of the target base 714 with the sync payload.

At step 752, the server 718 performs various automations based on the local recompute of the target base 714. Automations are described hereinabove.

At step 754, the server 718 transmits the information in the target base 714 to the editing client device 712 and the collaborating client device 710. The editing client device 712 views the same information in the target base 714 as the collaborating client device 710 views in the source base 716 because server 718 has completed two-way synchronization. That is, in this example, because the server 714 performs both a local and synced recompute on the target base 714, and only a local recompute on the source base 716, the information in each may be different.

In this example workflow, because the data synchronization module 240 enables "blocking, server-side writes" the CRUD queue is locked after an edit is generated and unlocked between the recompute and the transmit actions (e.g., just before transmit 724).

II.D Method 4: Inconsistent, Non-Blocking Server-Side Writes

Figure 8:
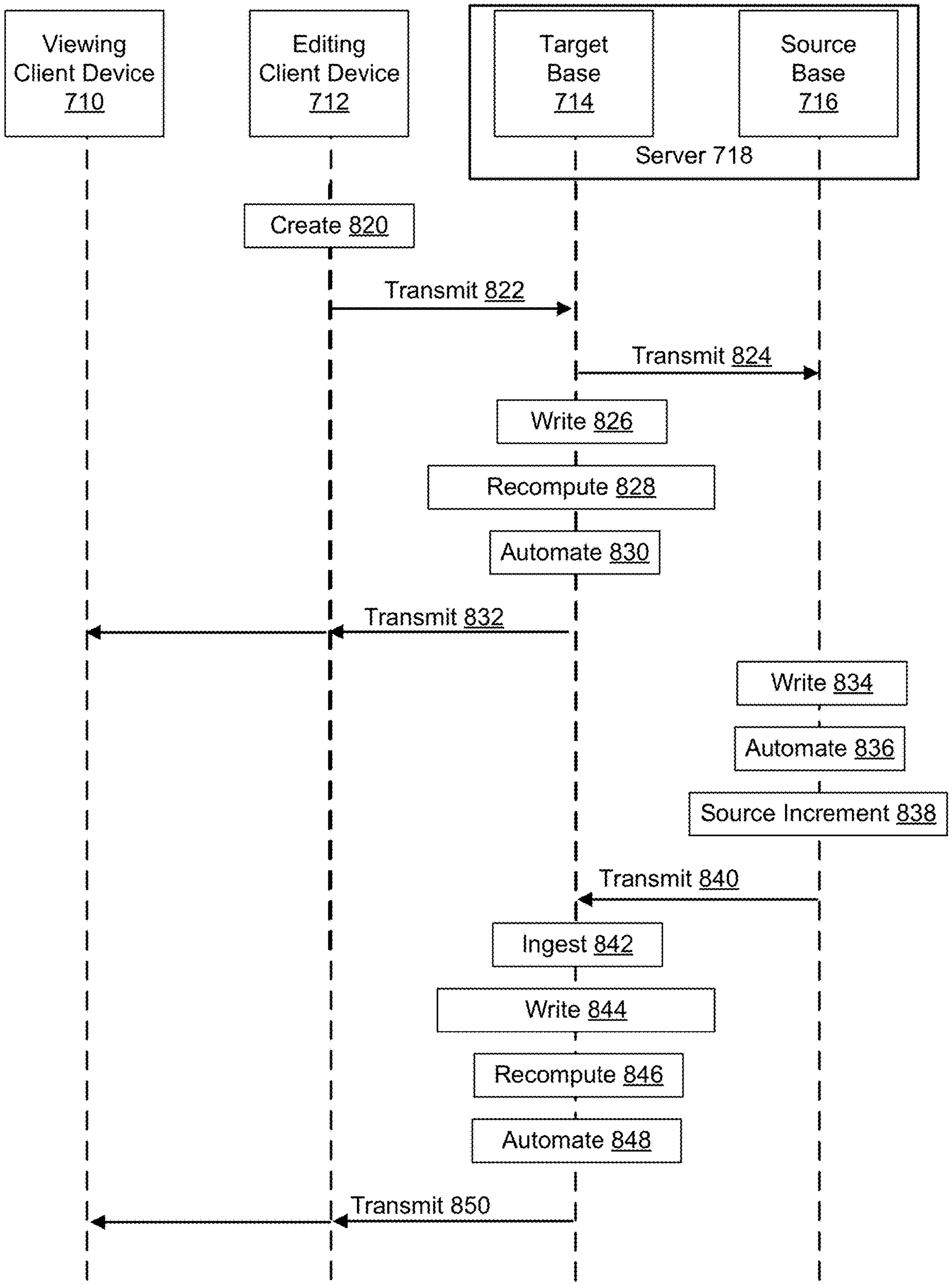
FIG. 8 illustrates an interaction diagram for a fourth example dual-synchronization process between a target base and a source base, according to one embodiment.

FIG. 8 illustrates an interaction diagram for a fourth example dual-synchronization process between a target base and a source base, according to one embodiment. The fourth process occurs within a system environment (e.g., system environment 100) and enables inconsistent, non-blocking server-side writes.

As illustrated, the system environment includes two client devices (e.g., client devices 140A, 140B)—an editing client device 812 and a collaborating client device 810. The client devices manipulate a target base 814 and a source base 816 in a base data store (e.g., base data store 210) on a server 818. The source base 816 is configured to synchronize information to the target base 814, and the target base 814 is configured to synchronize information to the source base 816 (i.e., two-way synchronization), as described below. The editing client device 812 is viewing the target base 814, and the viewing client device 810 is viewing the source base 816.

At step 820, a user operating the editing client device 812 creates 820 an edit using the target base 814. For instance, changing a field in the target base 814, i.e., generating a CRUD request. At this point, the target base 814 has not been updated with the edit because the edit exists locally on the editing client device 812 and has yet to be transmitted to the server 818.

At step 822, the editing client device 812 transmits the update to the target base 814. Transmitting the update may include transmitting the update created on the editing client device 812 to the server 818. As described above, this may close the CRUD queue for the target base 814 and add the edit to the sidecar.

At step 824, the server 818 transfers the edit from the target base 814 to the source base 816.

At step 826, the server 818 writes the edit to the target base 814. As described above, writing the edit to the target base 814 may come from pushing information from the sidecar to the target base 814. Writing the edit may include optimistic source data.

At step 828, the server recomputes the target base with the written edit. Recomputing the target base 814 may recompute local fields (i.e., local recompute), e.g., formulas, in the target base 814 dependent on the edit. Recomputing the target base 814 may include using the edit information stored in the sidecar.

At step 830, the server 830 performs various automations based on the local recompute of the target base 814. Automations are described hereinabove.

At step 832, the server 818 transmits the information in the target base 814 to the editing client device 812 and the collaborating client device 810. The editing client device 812 views different information in the target base 814 than the collaborating client device 810 views in the source base 816 because server 818 has only updated the target base 814 with optimistic source data.

At step 834, the server 818 writes the edit to the source base 816. Writing information to the source base 816 may include writing edits from the sidecar into the source base 816.

At step 836, the server 818 performs various automations based on the local recompute of the source base 816. Automations are described hereinabove.

At step 838, the server 818 increments the source base sync payload. Incrementing the source base sync payload, in effect, allows the server 818 to push source base 814 updates to synced target bases 816 in semi-real time, with each update reflecting the most recent update to the source base 816 (rather than each, or all, of the updates to the source base). Stated differently, the synchronization module may version each payload, and may sometimes collect multiple payloads (if created in rapid succession) and push them together to client devices.

At step 840, the server 818 transmits the sync payload from the source base 816 to the target base 814.

At step 842, the server 818 ingest and syncs the sync payloads from the source base 816. Much like syncing the source increments, syncing ingested payloads allows the server 818 to judiciously write updates to the target base 814 such that the written updates are not stale.

At step 844, the server 818 writes the sync payload to the target base 814.

At step 846, the server 818 performs a local recompute of the target base 814 with the sync payload.

At step 848, the server 818 performs various automations based on the local recompute of the target base 814. Automations are described hereinabove.

At step 850, the server 818 transmits the information in the target base 814 to the editing client device 812 and the collaborating client device 810. The editing client device 812 views the same information in the target base 814 as the collaborating client device 810 views in the source base 816 because server 818 has completed two-way synchronization. That is, in this example, because the server 814 performs both a local and synced recompute on the target base 814, and only a local recompute on the source base 816, the information in each may be different.

In this example workflow, because the data synchronization module 240 enables "inconsistent non-blocking, server-side writes" the CRUD queue is locked after an edit is generated and unlocked between the recompute and the transmit actions (e.g., just before transmit 724).

III. Illustrated Example

Figure 9:
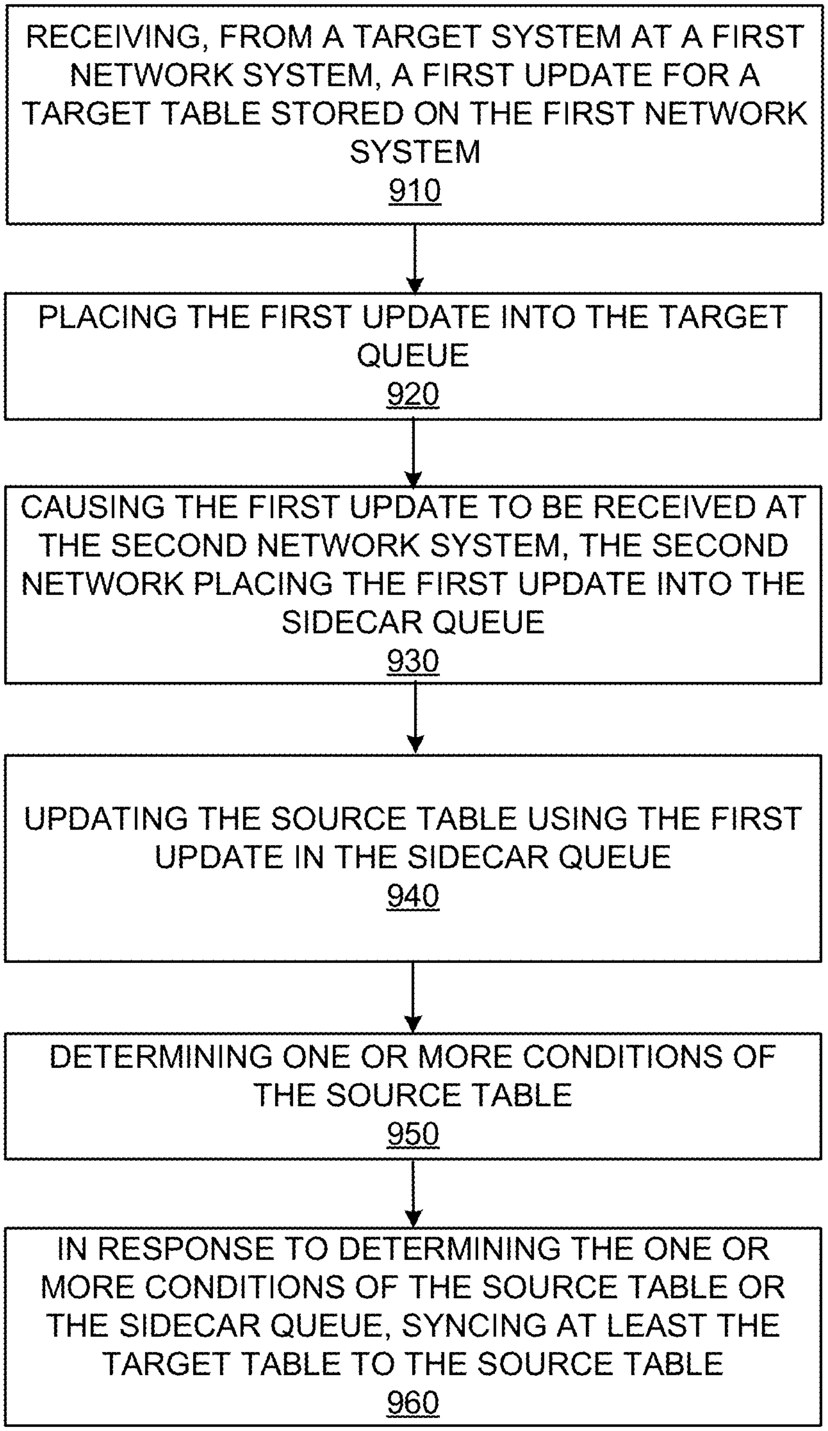
FIG. 9 illustrates a flow chart of a synchronization of a target table and a source table, according to one embodiment.

FIG. 9 is a flowchart depicting an example dual-synchronization process 900 between a target table (or target base) and a source base (or source base), in accordance with some embodiments. Some of the steps of the process 900 may be similar to those described in FIG. 4, which illustrates a two-way synchronization of two tables. Some of the steps of the process 900 may also be similar to the those provided in "Method 2: Consistent, Non-Blocking Server-Side Writes" of the present disclosure.

Parts of the process may be performed by one or more modules (such as the data sync module 240) of the computing server 110 of FIG. 2 operating at a first network, and one or more modules of a second computing server operating at a second network.

The process 900 may be embodied as a software algorithm that may be stored as computer instructions that are executable by one or more processors. The instructions, when executed by the processors, cause the processors to perform various steps in the process 900. In various embodiments, the process may include additional, fewer, or different steps. While various steps in process 900 may be discussed with the use of computing server 110, each step may be performed by a different computing device.

In some embodiments, the computing server 110 receives, from a target system (e.g., a client device) at a first network system, a first update for a target table stored on the first network system (step 910). The process may be initiated through a user interface of a client device, where a user updates the target table (e.g., the first update). For example, after the user updates the target table, the computing server 110 receives the update to the target table (e.g., the first update).

The target table may be stored on the first network system. The target table may be configured to receive updates from a source table located on the second network system. The updates to the target table may be managed according to a target queue (e.g., a CRUD queue). This process is a two-way synchronization between tables as explained further in the present disclosure.

In some embodiments, the computing server 110 places the first update into the target queue (step 920). The target queue may be similar to the CRUD queue (e.g., CRUD queue of FIG. 4) provided above in the present disclosure. The computing server 110 may block access to the target queue to prevent the target queue from receiving further requests for updating the target table until the first update has been placed into a sidecar queue. The sidecar queue may be similar to the sidecar table provided above in the present disclosure (e.g., sidecar of FIG. 4). Blocking of access to the target queue may provide controlled synchronization of updates.

For example, blocking of access to the target queue may prevent the target queue from receiving further requests for updating the target table until the first update has been processed and placed into a sidecar queue. This feature may maintain data integrity and provide data updates in an orderly and sequential manner. For example, when multiple updates occur concurrently, it can create complications such as update overlap or conflicts. These issues may corrupt the data or result in lost updates. Therefore, by blocking further updates temporarily, this feature may provide that each update is fully processed before moving onto the next one.

In some embodiments, the computing server 110 causes the first update to be received at a second network system (step 930), such as by transmitting the first update to a second computing server of a second network system. The second computing server of the second network places the first update into the sidecar queue when it receives the first update from the computing server 110. Placing the first update into the sidecar queue may provide separation of tasks between two network systems.

Additionally, the second network system can be responsible for managing multiple updates to the source table from several target tables. This feature may provide the distribution of tasks among multiple computing elements to increase efficiency. For example, the sidecar queue may provide a buffering mechanism. The sidecar queue may provide precise and orderly synchronization of updates between the target table and source table, mitigating potential data conflicts or losses.

In response to placing the first update into the sidecar queue, the second computing server may send a confirmation to the computing server 110 that the first update has been placed into the sidecar queue. In response to receiving this confirmation, the computer server 110 may unblock access to the target queue.

In some embodiments, the second computing server updates the source table using the first update in the sidecar queue (step 940). The second computing server may transmit a first request, from the sidecar queue to the source table to update the source table based on the first update. For example, the first request informs the source table of changes that have been made in the target table and thus need to be reflected in the source table. Updating the source table may include committing update information from the sidecar table to the source table. Typically, this is intended to keep the source table synchronized with the target table. Thus, an update may be committed to the source table by the second computing server. Upon successful commitment, the data in the source table is updated to reflect the first update of the target table.

In some embodiments, the second computing server determines one or more conditions of the source table (step 950). One condition may be: the source table has been successfully updated. Another condition may be: updates to the source table have failed. As such, the second computing server may determine that the source table has been successfully updated based on the first request for updating the target table (or updates to the source table have failed).

The second computing server may also determine one or more conditions of the sidecar, such as that the sidecar queue is empty. This feature may provide whether there are updates waiting to be committed to the source table. For example, if the sidecar queue is not empty, it indicates there are still updates to be processed. Conversely, if the sidecar queue is empty, it indicates that all updates have been processed.

In some embodiments, in response to determining the one or more conditions of the source table or the sidecar queue, the computing second server syncs the target table to the source table (step 960). In the event that the updates to the source table fail, the second computing server may attempt to retry the update, for example, after by taking remedial measures to address the issue that caused the failure. Alternatively, the second computing server may instruct the computing server 110 to refresh the target table to reflect the current state of the source table. This refresh restores the target table to reflect the original data from the source table. For example, the refresh rolls back any changes in the target table that have not been successfully mirrored in the source table. This feature may provide that the target table only presents data consistent with the actual, un-updated state of the source table.

In some embodiments, in the event of a successful update of the source table, the second computing server provides a notification (e.g., a confirmation message) and the updates to be made to the target table by the computing server 110 so that the computing server 110 can sync the target table to the source table. Syncing the target table to the source table provides that data in the target table matches the data in the source table.

After the synchronization process has successfully updated the target table, the updated information is then propagated, or pushed, to connected systems or users. For example, a connected system may be a collaborating table stored on a collaborating client device. This provides that all users or systems interacting with the target table have the most recent and consistent data. After the updates have successfully been incorporated into the source table and synchronized back to the target table, the sidecar queue (which held the updates) may be cleared.

In some embodiments, the computing server 110 may receive, from the target system a second update for a target table stored on the first network system. The computing server 110 then determines if the target queue is unblocked. In response to determining that the target queue is unblocked, the computing server 110 places the second update into the target queue.

The computing server 110 transmits the second update to the second computing server on the second network system. The second computing server places the second update into the sidecar queue. The second computing server transmits a second request, from the sidecar queue to the source table, to update the source table based on the second update. The second request to update the source table is treated the same way as the first request. Therefore, when the source table is been successful updated based on the second request, the target table is synced to the source table to reflect the updates made to the source table.

In some embodiment, a first collaborator may work on a first collaborating table stored on a first collaborating client device. A second collaborator may work on a second collaborating table stored on a second collaborating client device. The first and second collaborating client devices may send updates to the source table by transmitting updates on the second computing server on the second network system. The second computing server places the updates into the sidecar queue. The second computing server transmits a request, from the sidecar queue to the source table, to update the source table based on the updates provided by the first and second collaborating client devices. The request to update the source table is treated the same way as the first request described in the present disclosure. Therefore, when the source table is been successful updated based on the updates provided by the first and second collaborating client devices, the first and second collaborating tables are synced to the source table to reflect the updates made to the source table. The target table is also synced to the source table to reflect the updates made to the source table.

Referring to FIGS. 10A-10D, there are shown flow diagrams of a synchronization process for a target table 1002, a collaborator table 1004 and a source table 1006, according to one embodiment. The target table 10002 includes local dependent fields (column A), sync dependent fields (column B), and locked fields (columns C). The collaborator table 1004 has corresponding local dependent fields (column A), sync dependent fields (column B), and locked fields (columns C). The source table 1006 has sync dependent fields (column B). A local dependent field is an unlocked field that, when updated by the user, is automatically updated on the collaborating table. A sync dependent field is an unlocked field that, when updated by the user, is updated on the source table before syncing to the collaborating table. A locked field is local to the target (or collaborator). It updates whenever the fields it depends on are updated locally. In the embodiment shown, column C is a locked field and corresponds to the following function: C=A+B. For example, whenever A or B updates on the target table, C will update locally for the target table.

Figure 10A:
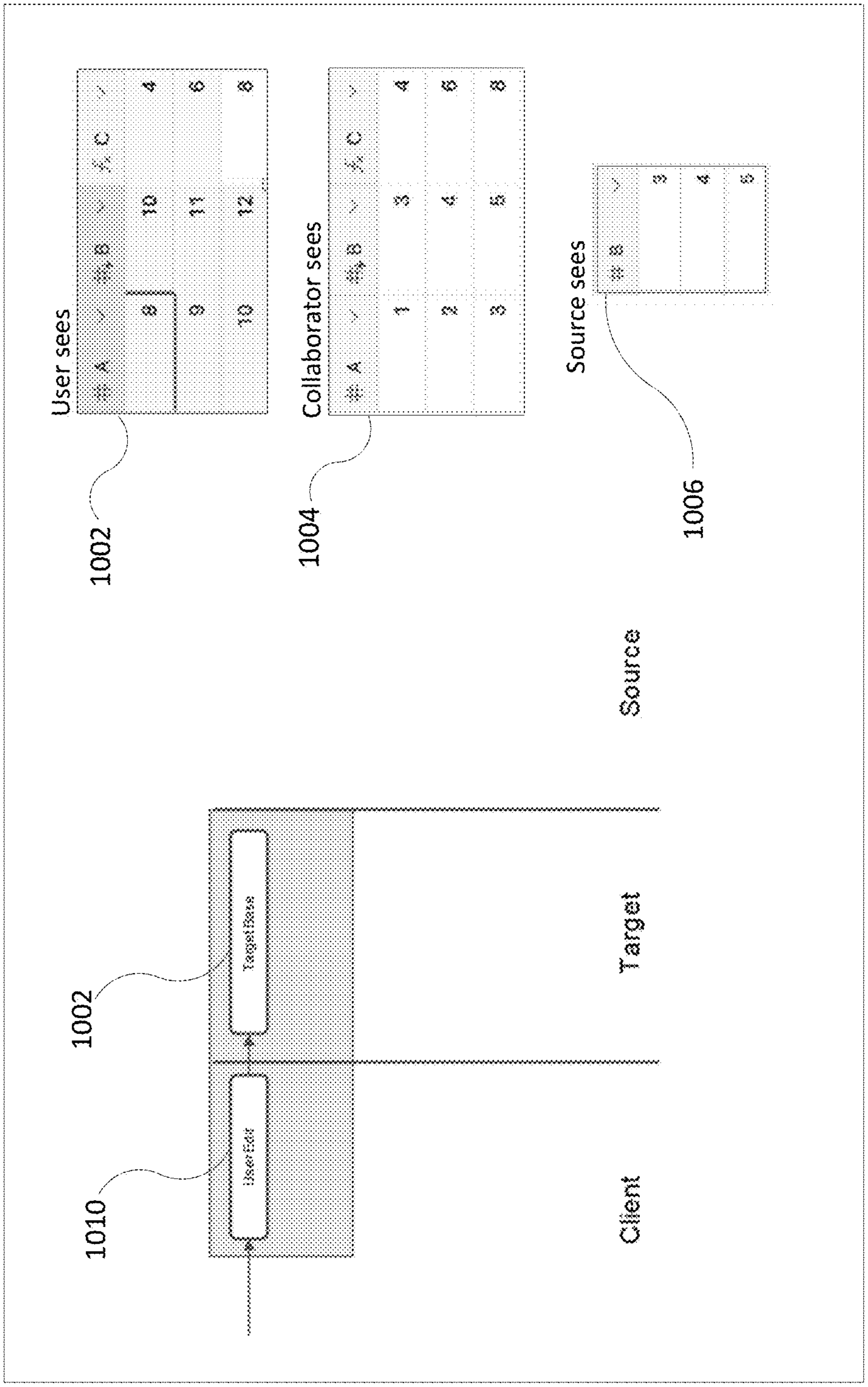
FIGS. 10A-10D illustrate flow diagrams of a synchronization process for a target table, a source table and a collaborator table according to one embodiment.

Referring now to FIG. 10A, at 1010 a user edits the local dependent fields (column A) and the sync dependent fields (column B) of the target table 1002. These updates are not yet reflected on the collaborator table 1004 and a source table 1006.

Figure 10B:
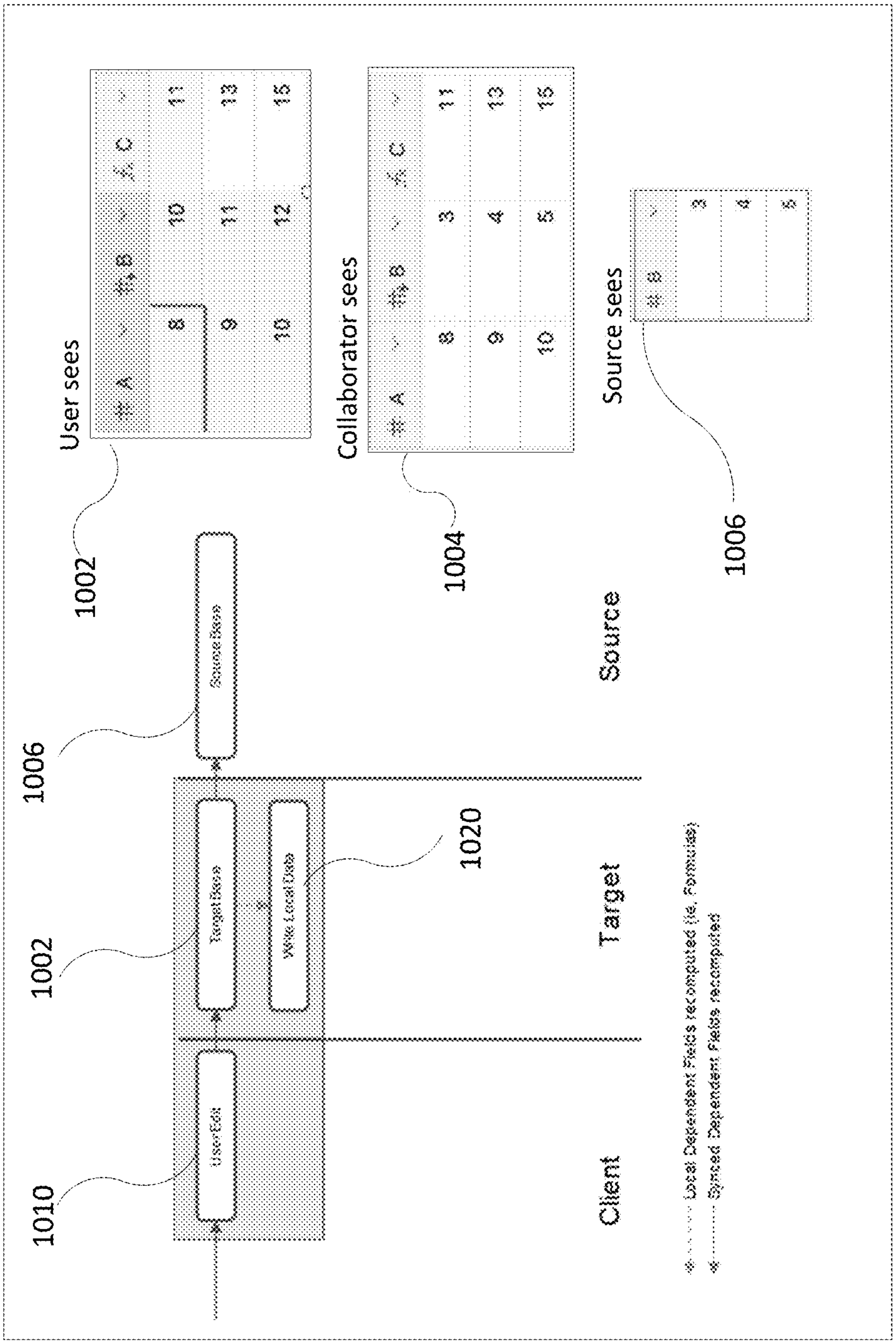

Referring now to FIG. 10B, the process described in FIG. 9 has been initiated, and the source table 1006 has now received a request from the sidecar queue to update the source table based on the edits made to the target table 1002 in FIG. 10A. Column C of the target table is updated based on column A's new value and column B's old value. The updates to the local dependent fields of target table 1002 are reflected on the collaborator table 1004. The updates to the sync fields of the target table 1002 are not yet reflected on the collaborator table 1004 and the source table 1006 because the source table 1006 has not yet received notice of the updates to the sync fields.

Figure 10C:
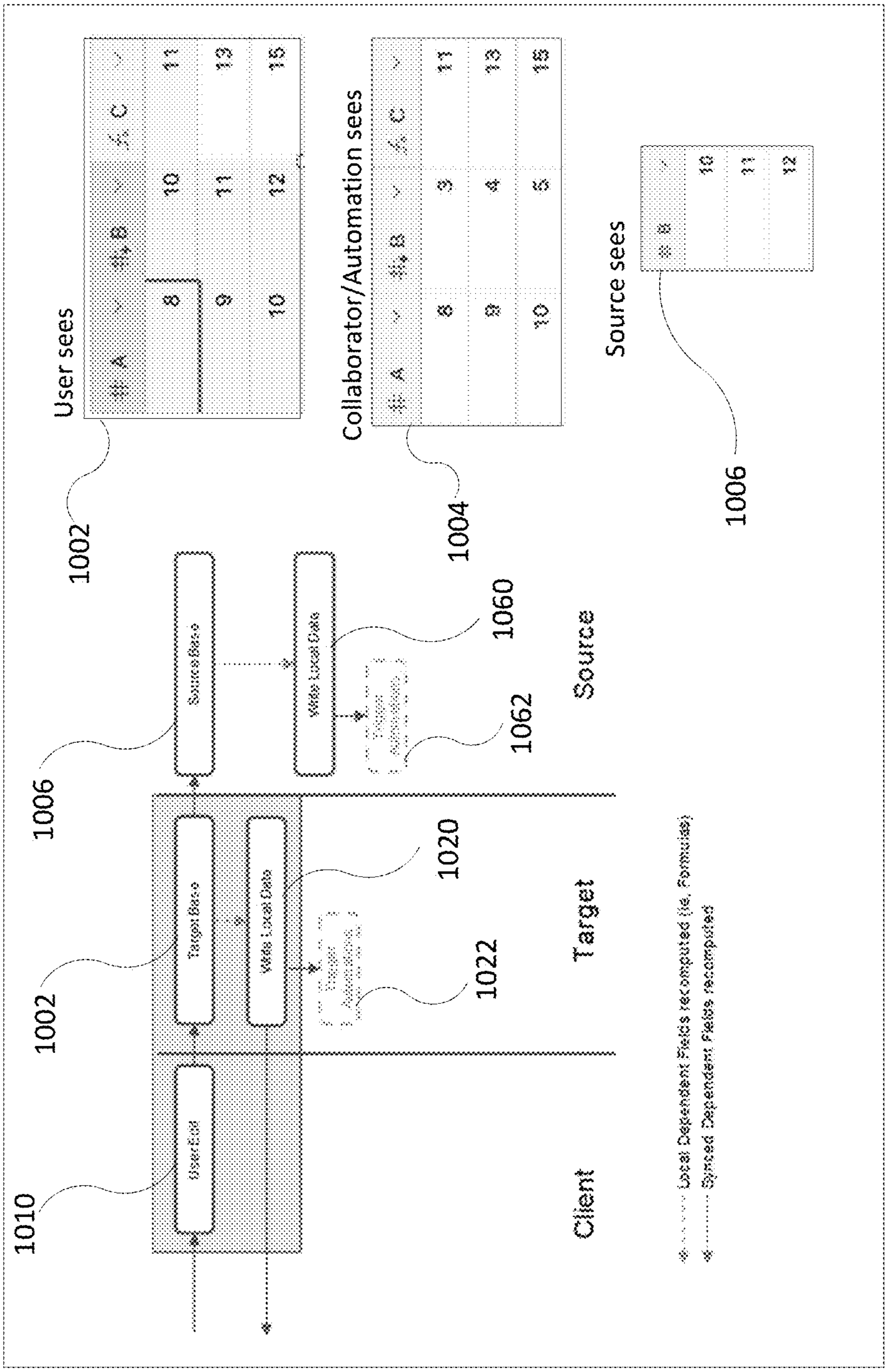

Referring now to FIG. 10C, at 1022, an automation is triggered. The automation may include sending a notification (such as an email) to notify of the change to a data field in a table. At 1060, the corresponding sync fields (column B) of the source table 1006 have been updated based on the request from the sidecar queue. At 1062, another automation may be triggered based on the updates to the source table.

Figure 10D:
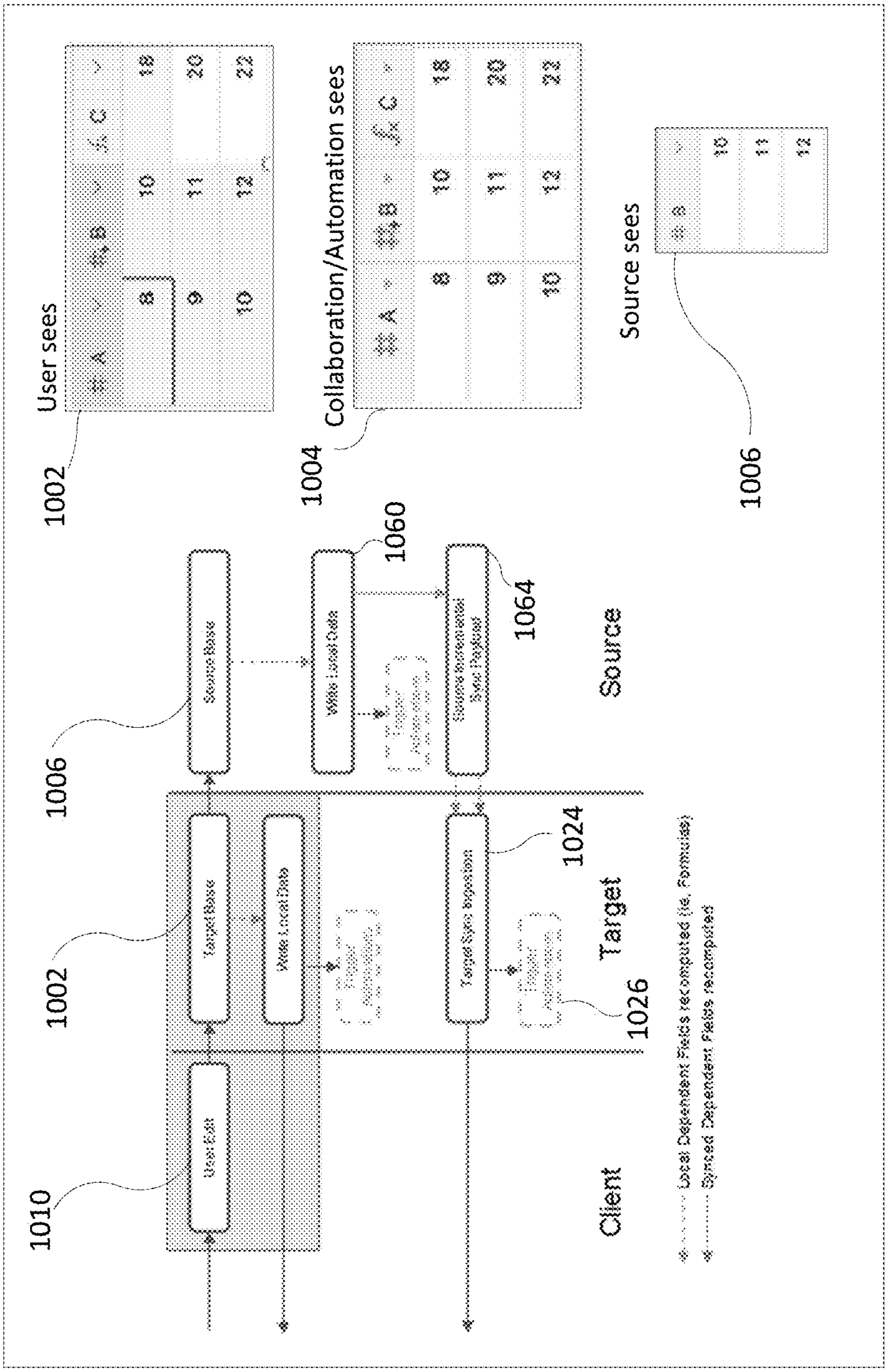

Referring now to FIG. 10D, at 1064 (source incremental sync payload) the sync dependent fields (column B) of the source table 1006 are updated based on any other request from the sidecar queue. At 1024 (target sync integration) the target table 1002 is synced to the source table 1006. In response, column B of the target table 1002 matches column B of the source table 1006 (e.g., information in column B of the source table 1006 is used to update column B of the target table 1002). Column B of the collaborating table 1004 is also synced to column B of the source table 1006. The locked fields (columns C) of the target table and the collaborating table 1004 are updated to reflect the updates to column B. At 1026, another automation may be triggered based on the updates at the target table.

IV. Computer System

Figure 11:
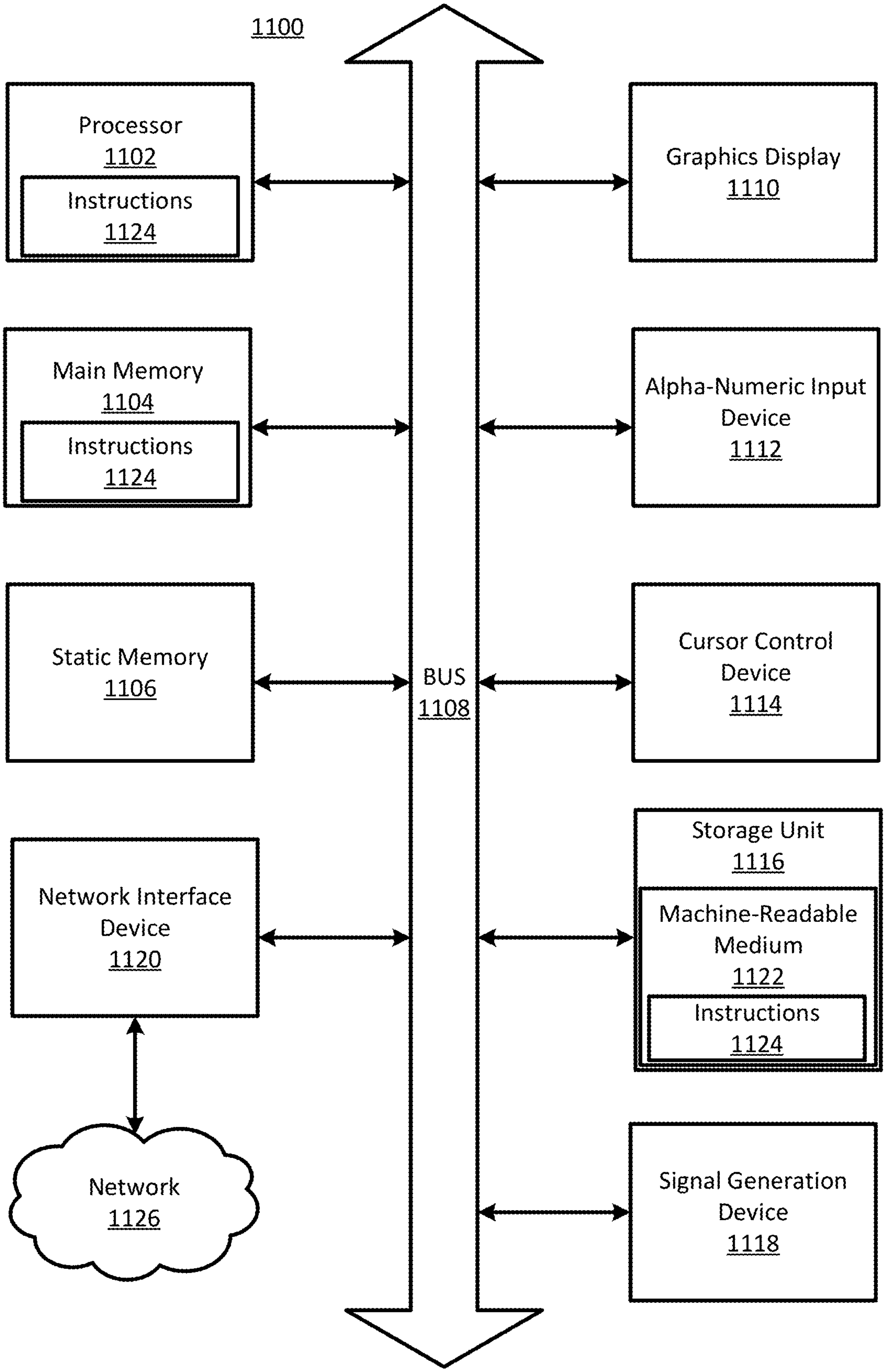
FIG. 11 is a block diagram illustrating an example of a computer suitable for use in the networked computing environment of FIG. 1, according to one embodiment.

FIG. 11 is a block diagram illustrating components of an example machine for reading and executing instructions from a machine-readable medium. Specifically, FIGS. 1 and 2 show a diagrammatic representation of server 110, external server 115, and client device 140 in the example form of a computer system 1100. The computer system 1100 can be used to execute instructions 1124 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100, or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes one or more processing units (generally processor 1102). The processor 1102 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1100 also includes a main memory 1104. The computer system may include a storage unit 1116. The processor 1102, memory 1104, and the storage unit 1116 communicate via a bus 1108.

In addition, the computer system 1100 can include a static memory 1106, a graphics display 1110 (e.g., to drive a plasma display panel (PDP), a liquid crystal display (LCD), or a projector). The computer system 1100 may also include alphanumeric input device 1112 (e.g., a keyboard), a cursor control device 1114 (e.g., a mouse, a trackball, a joystick, a motion sensor, or other pointing instrument), a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. For example, the instructions 1124 may include the functionalities of modules of the system 130 described in FIG. 1. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 may be transmitted or received over a network 1126 (e.g., network 120) via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store the instructions 1124. The term "machine-readable medium" shall also be taken to include any medium that is capable of storing instructions 1124 for execution by the machine and that cause the machine to perform any one or more of the methodologies disclosed herein. The term "machine-readable medium" includes, but not be limited to, data repositories in the form of solid-state memories, optical media, and magnetic media.

What is claimed is:

1. A computer implemented method, comprising:

receiving, from a target system at a first network system, a first update for a target table stored on the first network system, wherein:

the target table is also configured to receive updates from a source table located on a second network system, updates to the target table are managed according to a target queue, and updates to the source table are managed according to a sidecar queue, wherein the sidecar queue stores database update operations for synchronizing the source table with the target table;

in response to placing the first update into the target queue, blocking access to the target queue to prevent the target queue from receiving further requests for updating the target table until the first update has been placed into the sidecar queue;

receiving, from the second network system, a confirmation that the first update has been placed into the sidecar queue;

in response to receiving the confirmation from the second network system that the first updated has been placed into the sidecar queue for updating the source table, unblocking the target queue for the target table on the first network system, wherein unblocking the target queue allows new updates to enter the target queue;

updating the source table using the first update in the sidecar queue;

determining one or more conditions of the source table; and in response to determining the one or more conditions of the source table, syncing at least the target table to the source table to provide that data in the target table matches the data in the source table.

2. The method of claim 1, wherein determining the one or more conditions of the source table comprises:

determining, using the second network system, that the source table has been successfully updated based on the first request for updating the target table.

3. The method of claim 2, wherein determining, using the second network system, that the source table has been successfully updated based on the first request for updating the target table comprises refreshing the target table to reflect original data from the source table when the update to the source table has failed.

4. The method of claim 1, wherein syncing at least the target table to the source table comprises syncing a collaborating table stored on a collaborating client device.

5. The method of claim 1, wherein syncing at least the target table to the source table comprises updating sync fields on the target table that can be changed by the source table.

6. The method of claim 1, wherein syncing at least the target table to the source table comprises providing a notification of the synchronization to the target system.

7. The method of claim 1, wherein receiving, from the target system at the first network system, the first update for the target table stored on the first network system comprises:

providing the target table, including any one of: a local dependent field, a sync dependent field, and a locked field, wherein:

the local dependent field is an unlocked field that, when updated by a user, is automatically updated on a collaborating table stored on a collaborating client device, the sync dependent field is an unlocked field that, when updated by the user, is updated on the source table before syncing to the collaborating table stored on a collaborating client device, and the locked field is not updatable by the user; and receiving the first update for at least one of the local dependent field and the sync dependent field of the target table.

8. The method of claim 7, further comprising updating a corresponding local dependent field on the collaborating table stored on the collaborating client device when the local dependent field is updated by the user.

9. The method of claim 7, further comprising updating a corresponding sync dependent field on the collaborating table stored on the collaborating client device when the sync dependent field is updated on the source table.

10. The method of claim 7, further comprising updating the locked field on the source table based on updates to the local dependent field and/or the sync dependent field.

11. The method of claim 7, wherein syncing at least the target table to the source table comprises:

syncing the sync dependent field of the target table to a corresponding sync dependent field of the source table.

12. The method of claim 1, further comprising:

receiving, from the target system at the first network system, a second update for the target table;

determining whether the target queue is unblocked;

in response to determining that the target queue is unblocked, placing the second update into the target queue;

causing the second update to be sent second network system, the second network placing the second update into the sidecar queue;

updating the source table using the second update in the sidecar queue;

determining the one or more conditions of the source table, wherein determining the one or more conditions of the source table comprises:

determining, using the second network system, that the source table has been successfully updated based on the first and second request for updating the target table; and in response to determining the one or more conditions of the source table or the sidecar queue, syncing at least the target table to the source table.

13. The method of claim 1, further comprising:

while the target queue is blocked, receiving, from the target system at the first network system, a second update for the target table stored on the first network system; and preventing the second update from being added to the target queue.

14. A system, comprising:

one or more processors; and a non-transitory computer-readable storage medium storing computer program instructions executable by the one or more processors, the instructions comprising:

receiving, from a target system at a first network system, a first update for a target table stored on the first network system, wherein:

the target table is also configured to receive updates from a source table located on a second network system, updates to the target table are managed according to a target queue, and updates to the source table are managed according to a sidecar queue, wherein the sidecar queue stores database update operations for synchronizing the source table with the target table;

in response to placing the first update into the target queue, blocking access to the target queue to prevent the target queue from receiving further requests for updating the target table until the first update has been placed into the sidecar queue;

receiving, from the second network system, a confirmation that the first update has been placed into the sidecar queue;

in response to receiving the confirmation from the second network system that the first updated has been placed into the sidecar queue for updating the source table, unblocking the target queue for the target table on the first network system, wherein unblocking the target queue allows new updates to enter the target queue;

updating the source table using the first update in the sidecar queue;

determining one or more conditions of the source table; and in response to determining the one or more conditions of the source table, syncing at least the target table to the source table to provide that data in the target table matches the data in the source table.

15. The system of claim 14, wherein determining the one or more conditions of the source table comprises:

determining, using the second network system, that the source table has been successfully updated based on the first request for updating the target table.

16. The system of claim 14, wherein the instructions further comprises unblocking access to the target queue after placing the first update into the sidecar queue.

17. The system of method of claim 15, wherein determining, using the second network system, that the source table has been successfully updated based on the first request for updating the target table comprises refreshing the target table to reflect original data from the source table when the update to the source table has failed.

18. The system of claim 14, wherein syncing at least the target table to the source table comprises syncing a collaborating table stored on a collaborating client device.

19. The system of claim 14, wherein syncing at least the target table to the source table comprises updating locked data fields on the target table that can be changed by the source table.

20. A computer program product comprising a non-transitory computer readable storage medium having instructions encoded thereon that, when executed by a computing system, cause the computing system to perform operations including:

receiving, from a target system at a first network system, a first update for a target table stored on the first network system, wherein:

the target table is also configured to receive updates from a source table located on a second network system, updates to the target table are managed according to a target queue, and updates to the source table are managed according to a sidecar queue, wherein the sidecar queue stores database update operations for synchronizing the source table with the target table;

in response to placing the first update into the target queue, blocking access to the target queue to prevent the target queue from receiving further requests for updating the target table until the first update has been placed into the sidecar queue;

receiving, from the second network system, a confirmation that the first update has been placed into the sidecar queue;

in response to receiving the confirmation from the second network system that the first updated has been placed into the sidecar queue for updating the source table, unblocking the target queue for the target table on the first network system, wherein unblocking the target queue allows new updates to enter the target queue;

updating the source table using the first update in the sidecar queue;

determining one or more conditions of the source table; and in response to determining the one or more conditions of the source table, syncing at least the target table to the source table to provide that data in the target table matches the data in the source table.

* * * * *